(12) United States Patent
Djugash

(10) Patent No.: US 10,490,102 B2
(45) Date of Patent: Nov. 26, 2019

(54) SYSTEM AND METHOD FOR BRAILLE ASSISTANCE

(71) Applicant: Toyota Motor Engineering & Manufacturing North America, Inc., Erlanger, KY (US)

(72) Inventor: Joseph M. A. Djugash, San Jose, CA (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 111 days.

(21) Appl. No.: 14/618,950

(22) Filed: Feb. 10, 2015

(65) Prior Publication Data

US 2016/0232817 A1    Aug. 11, 2016

(51) Int. Cl.
*G09B 21/02* (2006.01)
*G09B 21/00* (2006.01)

(52) U.S. Cl.
CPC ........... *G09B 21/02* (2013.01); *G09B 21/002* (2013.01)

(58) Field of Classification Search
CPC .... G09B 21/02; G09B 21/002; G09B 21/005; G09B 21/008; G09B 21/001; B41J 3/32
USPC ........................................................ 434/114
See application file for complete search history.

(56) References Cited

U.S. PATENT DOCUMENTS

| | | | |
|---|---|---|---|
| 2,850,812 A * | 9/1958 | Mannheimer | G09B 21/02 434/115 |
| 4,520,501 A | 5/1985 | DuBrucq | |
| 4,586,827 A | 5/1986 | Hirsch et al. | |
| 4,786,966 A | 11/1988 | Hanson | |
| 5,047,952 A | 9/1991 | Kramer | |
| 5,097,856 A | 3/1992 | Chi-Sheng | |
| 5,129,716 A | 7/1992 | Holakovszky et al. | |
| 5,233,520 A | 8/1993 | Kretsch et al. | |
| 5,265,272 A | 11/1993 | Kurcbart | |
| 5,463,428 A | 10/1995 | Lipton et al. | |
| 5,508,699 A | 4/1996 | Silverman | |
| 5,539,665 A | 7/1996 | Lamming et al. | |
| 5,543,802 A | 8/1996 | Villevielle | |
| 5,544,050 A | 8/1996 | Abe | |
| 5,568,127 A | 10/1996 | Bang | |
| 5,636,038 A | 6/1997 | Lynt | |

(Continued)

FOREIGN PATENT DOCUMENTS

| | | |
|---|---|---|
| CN | 201260746 | 6/2009 |
| CN | 101527093 | 9/2009 |

(Continued)

OTHER PUBLICATIONS

Diallo, "Apple iOS 8: Top New Features", Sep. 18, 2014, Forbes, http://www.forbes.com/sites/amadoudiallo/2014/09/18/apple-ios-8-top-new-features/#780ea24d6c7e.*

(Continued)

*Primary Examiner* — Samchuan C Yao
*Assistant Examiner* — Lily M Del Valle
(74) *Attorney, Agent, or Firm* — Snell & Wilmer LLP

(57) ABSTRACT

A braille teaching/autocorrecting system includes a camera configured to detect image data corresponding to at least one braille character. The braille teaching/autocorrecting system also includes a processor coupled to the camera and configured to identify the at least one braille character based on the image data and determine feedback data based on the identification of the at least one braille character.

18 Claims, 11 Drawing Sheets

(56) References Cited

U.S. PATENT DOCUMENTS

| | | |
|---|---|---|
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,477,239 B1 | 11/2002 | Ohki |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,525,568 B2 | 4/2009 | Raghunath |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,351 B2 | 11/2010 | Bourne |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,591,412 B2 | 11/2013 | Kovarik et al. |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,718,672 B2 | 5/2014 | Xie et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,805,929 B2 | 8/2014 | Erol et al. |
| 8,812,244 B2 | 8/2014 | Angelides |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| 8,994,498 B2 | 3/2015 | Agrafioti |
| D727,194 S | 4/2015 | Wilson |
| 9,004,330 B2 | 4/2015 | White |
| 9,025,016 B2 | 5/2015 | Wexler et al. |
| 9,042,596 B2 | 5/2015 | Connor |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,185,489 B2 | 11/2015 | Gerber et al. |
| 9,190,058 B2 | 11/2015 | Klein |
| 9,104,806 B2 | 12/2015 | Stivoric et al. |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,275,376 B2 | 3/2016 | Barraclough et al. |
| 9,304,588 B2 | 4/2016 | Aldossary |
| D756,958 S | 5/2016 | Lee et al. |
| D756,959 S | 5/2016 | Lee et al. |

(56) References Cited

U.S. PATENT DOCUMENTS

| | | |
|---|---|---|
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Arthur Hunter |
| 2003/0133008 A1 | 7/2003 | Stephenson |
| 2003/0133085 A1 | 7/2003 | Tretiakoff |
| 2003/0179133 A1 | 9/2003 | Pepin et al. |
| 2004/0056907 A1 | 3/2004 | Sharma |
| 2004/0232179 A1 | 11/2004 | Chauhan |
| 2004/0267442 A1 | 12/2004 | Fehr et al. |
| 2005/0020845 A1 | 9/2005 | Fink et al. |
| 2005/0221260 A1* | 10/2005 | Kikuchi ............... G09B 21/003 434/112 |
| 2005/0259035 A1 | 11/2005 | Iwaki |
| 2005/0283752 A1 | 12/2005 | Fruchter |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0182812 A1 | 8/2007 | Ritchey |
| 2007/0202865 A1 | 8/2007 | Moride |
| 2007/0230786 A1* | 10/2007 | Foss .................... G06K 9/20 382/182 |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0144854 A1 | 6/2008 | Abreu |
| 2008/0145822 A1 | 6/2008 | Bucchieri |
| 2008/0174676 A1 | 7/2008 | Squilla et al. |
| 2008/0181501 A1* | 7/2008 | Faraboschi ........ G06F 3/03545 382/179 |
| 2008/0198222 A1 | 8/2008 | Gowda |
| 2008/0198324 A1 | 8/2008 | Fuziak |
| 2008/0208455 A1 | 8/2008 | Hartman |
| 2008/0251110 A1 | 10/2008 | Pede |
| 2008/0260210 A1* | 10/2008 | Kobeli ................ G09B 21/006 382/114 |
| 2009/0012788 A1 | 1/2009 | Gilbert |
| 2009/0040215 A1 | 2/2009 | Afzulpurkar |
| 2009/0058611 A1 | 3/2009 | Kawamura |
| 2009/0106016 A1 | 4/2009 | Athsani |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2009/0210596 A1 | 8/2009 | Furuya |
| 2010/0041378 A1 | 2/2010 | Aceves |
| 2010/0080418 A1 | 4/2010 | Ito |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0194976 A1* | 8/2010 | Smith ................. G06F 3/0425 348/373 |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0125735 A1 | 5/2011 | Petrou |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0234584 A1 | 9/2011 | Endo |
| 2011/0246064 A1 | 10/2011 | Nicholson |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0082962 A1* | 4/2012 | Schmidt .................. B41M 3/16 434/114 |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1 | 8/2012 | Abreu |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1* | 12/2012 | Shiratori ................ G06F 3/011 348/47 |
| 2013/0002452 A1 | 1/2013 | Lauren |
| 2013/0038521 A1* | 2/2013 | Sugaya ................ G06F 3/0304 345/156 |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0090133 A1 | 4/2013 | D'Jesus Bencci |
| 2013/0115578 A1 | 5/2013 | Shiina |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0144629 A1 | 6/2013 | Johnston |
| 2013/0155474 A1 | 6/2013 | Roach et al. |
| 2013/0157230 A1 | 6/2013 | Morgan |
| 2013/0184982 A1 | 7/2013 | DeLuca |
| 2013/0201344 A1 | 8/2013 | Sweet, III |
| 2013/0202274 A1 | 8/2013 | Chan |
| 2013/0204605 A1 | 8/2013 | Illgner-Fehns |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0243250 A1 | 9/2013 | France |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0265450 A1 | 10/2013 | Barnes, Jr. |

(56) References Cited

U.S. PATENT DOCUMENTS

| | | |
|---|---|---|
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1* | 11/2013 | Wagner ............... G06F 17/273 704/235 |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1 | 2/2014 | Takahama |
| 2014/0071234 A1 | 3/2014 | Millett |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0160250 A1 | 6/2014 | Pomerantz |
| 2014/0184384 A1 | 7/2014 | Zhu et al. |
| 2014/0184775 A1 | 7/2014 | Drake |
| 2014/0204245 A1 | 7/2014 | Wexler |
| 2014/0222023 A1 | 8/2014 | Kim et al. |
| 2014/0233859 A1 | 8/2014 | Cho |
| 2014/0236932 A1 | 8/2014 | Ikonomov |
| 2014/0249847 A1 | 9/2014 | Soon-Shiong |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1* | 9/2014 | Prilepov ............... G06F 17/273 715/257 |
| 2014/0287382 A1* | 9/2014 | Villar Cloquell ...... G09B 21/02 434/115 |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379251 A1 | 12/2014 | Tolstedt |
| 2014/0379336 A1 | 12/2014 | Bhatnager |
| 2015/0002808 A1 | 1/2015 | Rizzo, III et al. |
| 2015/0016035 A1 | 1/2015 | Tussy |
| 2015/0058237 A1 | 2/2015 | Bailey |
| 2015/0063661 A1 | 3/2015 | Lee |
| 2015/0081884 A1 | 3/2015 | Maguire |
| 2015/0084884 A1* | 3/2015 | Cherradi El Fadili ................. G06F 3/041 345/173 |
| 2015/0099946 A1 | 4/2015 | Sahin |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0135310 A1 | 5/2015 | Lee |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1* | 7/2015 | Chen ................. G01C 21/3629 701/428 |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1 | 11/2015 | Kimia |
| 2015/0330787 A1 | 11/2015 | Cioffi et al. |
| 2015/0336276 A1 | 11/2015 | Song |
| 2015/0338917 A1 | 11/2015 | Steiner et al. |
| 2015/0341591 A1 | 11/2015 | Kelder et al. |
| 2015/0346496 A1 | 12/2015 | Haddick et al. |
| 2015/0356345 A1 | 12/2015 | Velozo |
| 2015/0356837 A1 | 12/2015 | Pajestka |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1 | 1/2016 | Venkatraman |
| 2016/0028917 A1 | 1/2016 | Wexler |
| 2016/0042228 A1 | 2/2016 | Opalka |
| 2016/0078289 A1 | 3/2016 | Michel |
| 2016/0098138 A1 | 4/2016 | Park |
| 2016/0156850 A1 | 6/2016 | Werblin et al. |
| 2016/0198319 A1 | 7/2016 | Huang |
| 2016/0350514 A1* | 12/2016 | Rajendran ............ G06F 19/322 |

FOREIGN PATENT DOCUMENTS

| | | | |
|---|---|---|---|
| CN | 201440733 | 4/2010 | |
| CN | 101803988 | 8/2010 | |
| CN | 101647745 | 1/2011 | |
| CN | 102316193 | 1/2012 | |
| CN | 102631280 | 8/2012 | |
| CN | 202547659 | 11/2012 | |
| CN | 102929394 A * | 2/2013 | |
| CN | 202722736 | 2/2013 | |
| CN | 102323819 | 6/2013 | |
| CN | 103445920 | 12/2013 | |
| DE | 102011080056 | 1/2013 | |
| DE | 102012000587 | 7/2013 | |
| DE | 102012202614 | 8/2013 | |
| EP | 1174049 | 9/2004 | |
| EP | 1721237 | 11/2006 | |
| EP | 2368455 | 9/2011 | |
| EP | 2371339 | 10/2011 | |
| EP | 2127033 | 8/2012 | |
| EP | 2581856 | 4/2013 | |
| EP | 2751775 | 7/2016 | |
| FR | 2885251 | 11/2006 | |
| GB | 2401752 | 11/2004 | |
| JP | 1069539 | 3/1998 | |
| JP | 2001304908 | 10/2001 | |
| JP | 2010012529 | 1/2010 | |
| JP | 2010182193 | 8/2010 | |
| JP | 4727352 B2 * | 7/2011 | ............ G01B 11/30 |
| JP | 2013169611 | 9/2013 | |
| KR | 100405636 | 11/2003 | |
| KR | 20080080688 | 9/2008 | |
| KR | 20120020212 | 3/2012 | |
| KR | 1250929 | 4/2013 | |
| WO | WO1995004440 | 2/1995 | |
| WO | WO 9949656 | 9/1999 | |
| WO | WO 0010073 | 2/2000 | |
| WO | WO 0038393 | 6/2000 | |
| WO | WO 179956 | 10/2001 | |
| WO | WO 2004/076974 | 9/2004 | |
| WO | WO 2006/028354 | 3/2006 | |
| WO | WO 2006/045819 | 5/2006 | |
| WO | WO 2007/031782 | 3/2007 | |
| WO | WO 2008/008791 | 1/2008 | |
| WO | WO 2008015375 | 2/2008 | |
| WO | WO 2008/035993 | 3/2008 | |
| WO | WO 2008/096134 | 8/2008 | |
| WO | WO2008127316 | 10/2008 | |
| WO | WO 2010/062481 | 6/2010 | |
| WO | WO 2010/109313 | 9/2010 | |
| WO | WO 2012/040703 | 3/2012 | |
| WO | WO2012163675 | 12/2012 | |
| WO | WO 2013/045557 | 4/2013 | |
| WO | WO 2013/054257 | 4/2013 | |
| WO | WO 2013/067539 | 5/2013 | |
| WO | WO 2013/147704 | 10/2013 | |
| WO | WO 2014104531 | 7/2014 | |

(56) References Cited

FOREIGN PATENT DOCUMENTS

| WO | WO2014104531 | 7/2014 |
|---|---|---|
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Zhang, Shanjun; Yoshino, Kazuyoshi; A Braille Recognition System by the Mobile Phone with Embedded Camera; 2007; IEEE.*
Diallo, Amadou; Sep. 18, 2014; Apple iO58: Top New Features, Forbes Magazine.*
N. Kalar, T. Lawers, D. Dewey, T. Stepleton, M.B. Dias; Iterative Designe of a Braille Writing Tutor to Combat Illiteracy; Aug. 30, 2007; IEEE.*
The Nex Band; http://www.mightycast.com/#faq; May 19, 2015; 4 pages.
Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.
Bujacz et al.; "Remote Guidance for the Blind—A Proposed Teleassistance System and Navigation Trials"; Conference on Human System Interactions; May 25-27, 2008; 6 pages.
Rodriguez et al; "CrowdSight: Rapidly Prototyping Intelligent Visual Processing Apps"; AAAI Human Computation Workshop (HCOMP); 2011; 6 pages.
Chaudary et al.; "Alternative Navigation Assistance Aids for Visually Impaired Blind Persons"; Proceedings of ICEAPVI; Feb. 12-14, 2015; 5 pages.
Garaj et al.; "A System for Remote Sighted Guidance of Visually Impaired Pedestrians"; The British Journal of Visual Impairment; vol. 21, No. 2, 2003; 9 pages.
Coughlan et al.; "Crosswatch: A System for Providing Guidance to Visually Impaired Travelers at Traffic Intersections"; Journal of Assistive Technologies 7.2; 2013; 17 pages.
Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.
Paladugu et al.; "GoingEasy® with Crowdsourcing in the Web 2.0 World for Visually Impaired Users: Design and User Study"; Arizona State University; 8 pages.
Kammoun et al.; "Towards a Geographic Information System Facilitating Navigation of Visually Impaired Users"; Springer Berlin Heidelberg; 2012; 8 pages.
Bigham et al.; "VizWiz: Nearly Real-Time Answers to Visual Questions" Proceedings of the 23nd annual ACM symposium on User interface software and technology; 2010; 2 pages.
Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.
Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.
Shoval et al.; "Navbelt and the Guidecane—Robotics-Based Obstacle—Avoidance Systems for the Blind and Visually Impaired"; IEEE Robotics & Automation Magazine, vol. 10, Issue 1; Mar. 2003; 12 pages.
Dowling et al.; "Intelligent Image Processing Constraints for Blind Mobility Facilitated Through Artificial Vision"; 8th Australian and NewZealand Intelligent Information Systems Conference (ANZIIS); Dec. 10-12, 2003; 7 pages.

Heyes, Tony; "The Sonic Pathfinder an Electronic Travel Aid for the Vision Impaired"; http://members.optuszoo.com.au/aheyew40/pa/pf_blerf.html; Dec. 11, 2014; 7 pages.
Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.
Wilson, Jeff, et al. "Swan: System for Wearable Audio Navigation"; 11th IEEE International Symposium on Wearable Computers; Oct. 11-13, 2007; 8 pages.
Borenstein et al.; "The GuideCane—A Computerized Travel Aid for the Active Guidance of Blind Pedestrians"; IEEE International Conference on Robotics and Automation; Apr. 21-27, 1997; 6 pages.
Bhatlawande et al.; "Way-finding Electronic Bracelet for Visually Impaired People"; IEEE Point-of-Care Healthcare Technologies (PHT), Jan. 16-18, 2013; 4 pages.
Blenkhorn et al.; "An Ultrasonic Mobility Device with Minimal Audio Feedback"; Center on Disabilities Technology and Persons with Disabilities Conference; Nov. 22, 1997; 5 pages.
Mann et al.; "Blind Navigation with a Wearable Range Camera and Vibrotactile Helmet"; 19th ACM International Conference on Multimedia; Nov. 28, 2011; 4 pages.
Shoval et al.; "The Navbelt—A Computerized Travel Aid for the Blind"; RESNA Conference, Jun. 12-17, 1993; 6 pages.
Kumar et al.; "An Electronic Travel Aid for Navigation of Visually Impaired Persons"; Communications Systems and Networks (COMSNETS), 2011 Third International Conference; Jan. 2011; 5 pages.
Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.
Pagliarini et al.; "Robotic Art for Wearable"; Proceedings of EUROSIAM: European Conference for the Applied Mathematics and Informatics 2010; 10 pages.
Greenberg et al.; "Finding Your Way: A Curriculum for Teaching and Using the Braillenote with Sendero GPS 2011"; California School for the Blind; 2011; 190 pages.
Helal et al.; "Drishti: An Integrated Navigation System for Visually Impaired and Disabled"; Fifth International Symposium on Wearable Computers; Oct. 8-9, 2001; 8 pages.
Parkes, Don; "Audio Tactile Systems for Designing and Learning Complex Environments as a Vision Impaired Person: Static and Dynamic Spatial Information Access"; EdTech-94 Proceedings; 1994; 8 pages.
Zeng et al.; "Audio-Haptic Browser for a Geographical Information System"; ICCHP 2010, Part II, LNCS 6180; Jul. 14-16, 2010; 8 pages.
AiZuhair et al.; "NFC Based Applications for Visually Impaired People—A Review"; IEEE International Conference on Multimedia and Expo Workshops (ICMEW), Jul. 14, 2014; 7 pages.
Graf, Christian; "Verbally Annotated Tactile Maps—Challenges and Approaches"; Spatial Cognition VII, vol. 6222; Aug. 15-19, 2010; 16 pages.
Hamid, Nazatul Naquiah Abd; "Facilitating Route Learning Using Interactive Audio-Tactile Maps for Blind and Visually Impaired People"; CHI 2013 Extended Abstracts; Apr. 27, 2013; 6 pages.
Ramya, et al.; "Voice Assisted Embedded Navigation System for the Visually Impaired"; International Journal of Computer Applications; vol. 64, No. 13, Feb. 2013; 7 pages.
Caperna et al.; "A Navigation and Object Location Device for the Blind"; Tech. rep. University of Maryland College Park; May 2009; 129 pages.
Burbey et al.; "Human Information Processing with the Personal Memex"; ISE 5604 Fall 2005; Dec. 6, 2005; 88 pages.
Ghiani, et al.; "Vibrotactile Feedback to Aid Blind Users of Mobile Guides"; Journal of Visual Languages and Computing 20; 2009; 13 pages.
Guerrero et al.; "An Indoor Navigation System for the Visually Impaired"; Sensors vol. 12, Issue 6; Jun. 13, 2012; 23 pages.
Nordin et al.; "Indoor Navigation and Localization for Visually Impaired People Using Weighted Topological Map"; Journal of Computer Science vol. 5, Issue 11; 2009; 7 pages.

(56) References Cited

OTHER PUBLICATIONS

Hesch et al.; "*Design and Analysis of a Portable Indoor Localization Aid for the Visually Impaired*"; International Journal of Robotics Research; vol. 29; Issue 11; Sep. 2010; 15 pgs.

Joseph et al.; "*Visual Semantic Parameterization—to Enhance Blind User Perception for Indoor Navigation*"; Multimedia and Expo Workshops (ICMEW), 2013 IEEE International Conference; Jul. 15, 2013; 7 pages.

Katz et al; "*NAVIG: Augmented Reality Guidance System for the Visually Impaired*"; Virtual Reality (2012) vol. 16; 2012; 17 pages.

Rodriguez et al.; "*Assisting the Visually Impaired: Obstacle Detection and Warning System by Acoustic Feedback*"; Sensors 2012; vol. 12; 21 pages.

Treuillet; "*Outdoor/Indoor Vision-Based Localization for Blind Pedestrian Navigation Assistance*"; WSPC/Instruction File; May 23, 2010; 16 pages.

Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.

Wang, et al.; "*Camera-Based Signage Detection and Recognition for Blind Persons*"; 13th International Conference (ICCHP) Part 2 Proceedings; Jul. 11-13, 2012; 9 pages.

Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.

Lee et al.; "*A Walking Guidance System for The Visually Impaired*"; International Journal of Pattern Recognition and Artificial Intelligence; vol. 22; No. 6; 2008; 16 pages.

Ward et al.; "*Visual Experiences in the Blind Induced by an Auditory Sensory Substitution Device*"; Journal of Consciousness and Cognition; Oct. 2009; 30 pages.

Merino-Garcia, et al.; "*A Head-Mounted Device for Recognizing Text in Natural Sciences*"; CBDAR'11 Proceedings of the 4th International Conference on Camera-Based Document Analysis and Recognition; Sep. 22, 2011; 7 pages.

Yi, Chucai; "*Assistive Text Reading from Complex Background for Blind Persons*"; CBDAR'11 Proceedings of the 4th International Conference on Camera-Based Document Analysis and Recognition; Sep. 22, 2011; 7 pages.

Yang, et al.; "*Towards Automatic Sign Translation*"; The Interactive Systems Lab, Carnegie Mellon University; 2001; 5 pages.

Meijer, Dr. Peter B.L.; "*Mobile OCR, Face and Object Recognition for the Blind*"; The vOICe, www.seeingwithsound.com/ocr.htm; Apr. 18, 2014; 7 pages.

Omron; Optical Character Recognition Sensor User's Manual; 2012; 450 pages.

Park, Sungwoo; "*Voice Stick*"; www.yankodesign.com/2008/08/21/voice-stick; Aug. 21, 2008; 4 pages.

Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.

Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.

Glover et al.; "*A Robotically-Augmented Walker for Older Adults*"; Carnegie Mellon University, School of Computer Science; Aug. 1, 2003; 13 pages.

OrCam; www.orcam.com; Jul. 22, 2014; 3 pages.

Eccles, Lisa; "*Smart Walker Detects Obstacles*"; Electronic Design; http://electronicdesign.com/electromechanical/smart-walker-detects-obstacles; Aug. 20, 2001; 2 pages.

Graft, Birgit; "*An Adaptive Guidance System for Robotic Walking Aids*"; Journal of Computing and Information Technology—CIT 17; 2009; 12 pages.

Frizera et al.; "*The Smart Walkers as Geriatric Assistive Device. The SIMBIOSIS Purpose*"; Gerontechnology, vol. 7, No. 2; Jan. 30, 2008; 6 pages.

Rodriquez-Losada et al.; "*Guido, The Robotic Smart Walker for the Frail Visually Impaired*"; IEEE International Conference on Robotics and Automation (ICRA); Apr. 18-22, 2005; 15 pages.

Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.

Kalra et al.; "*A Braille Writing Tutor to Combat Illiteracy in Developing Communities*"; Carnegie Mellon University Research Showcase, Robotics Institute; 2007; 10 pages.

Blaze Engineering; "*Visually Impaired Resource Guide: Assistive Technology for Students who use Braille*"; Braille 'n Speak Manual; http://www.blaize.com; Nov. 17, 2014; 5 pages.

AppleVis; *An Introduction to Braille Screen Input on iOS 8*; http://www.applevis.com/guides/braille-ios/introduction-braille-screen-input-ios-8, Nov. 16, 2014; 7 pages.

Dias et al.; "*Enhancing an Automated Braille Writing Tutor*"; IEEE/RSJ International Conference on Intelligent Robots and Systems; Oct. 11-15 2009; 7 pages.

D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.

Trinh et al.; "*Phoneme-based Predictive Text Entry Interface*"; Proceedings of the 16th International ACM SIGACCESS Conference on Computers & Accessibility; Oct. 2014; 2 pgs.

Merri et al.; "*The Instruments for a Blind Teacher of English: The challenge of the board*"; European Journal of Psychology of Education, vol. 20, No. 4 (Dec. 2005), 15 pages.

Kirinic et al.; "*Computers in Education of Children with Intellectual and Related Developmental Disorders*"; International Journal of Emerging Technologies in Learning, vol. 5, 2010, 5 pages.

Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.

Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.

Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.

Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.

Bharathi et al.; "Effective Navigation for Visually Impaired by Wearable Obstacle Avoidance System;" *2012 International Conference on Computing, Electronics and Electrical Technologies(ICCEET)*; pp. 956-958; 2012.

Pawar et al.; "Review Paper on Multitasking Stick for Guiding Safe Path for Visually Disable People;" *IJPRET*; vol. 3, No. 9; pp. 929-936; 2015.

Ram et al.; "The People Sensor: A Mobility Aid for the Visually Impaired;" 2012 16th International Symposium on Wearable Computers; pp. 166-167; 2012.

Singhal; "The Development of an Intelligent Aid for Blind and Old People;" *Emerging Trends and Applications in Computer Science (ICETACS), 2013 1st International Conference*; pp. 182-185; Sep. 13, 2013.

Aggarwal et al.; "All-in-One Companion for Visually Impaired;" *International Journal of Computer Applications*; vol. 79, No. 14; pp. 37-40; Oct. 2013.

"Light Detector" *EveryWare Technologies*; 2 pages; Jun. 18, 2016.

Arati et al. "Object Recognition in Mobile Phone Application for Visually Impaired Users;" *IOSR Journal of Computer Engineering (IOSR-JCE)*; vol. 17, Impaired No. 1; pp. 30-33; Jan. 2015.

(56) References Cited

OTHER PUBLICATIONS

Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.
Wu et al. "Fusing Multi-Modal Features for Gesture Recognition", Proceedings of the $15^{th}$ ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" $10^{th}$ USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.

\* cited by examiner

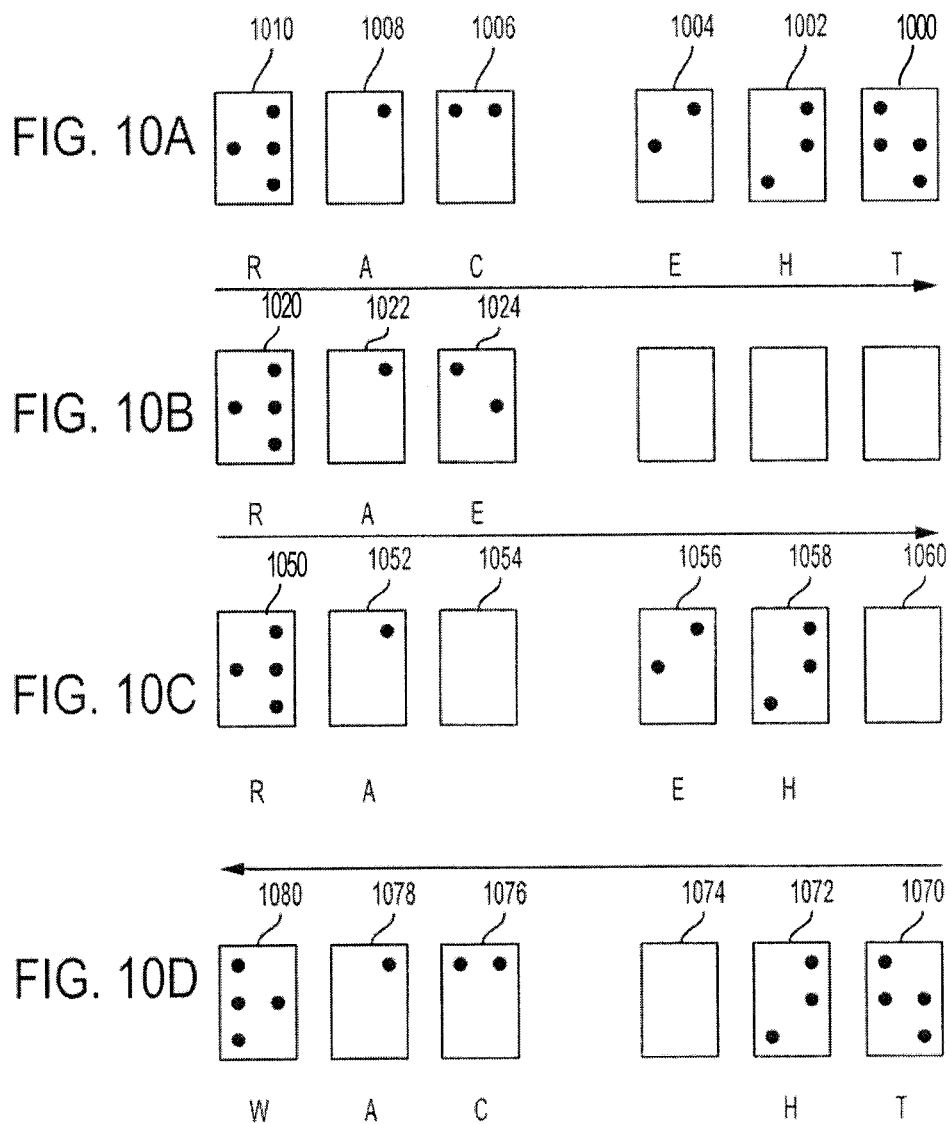

SYSTEM AND METHOD FOR BRAILLE ASSISTANCE

BACKGROUND

Field

The present disclosure relates to a method and a system for autocorrecting and/or teaching braille.

Description of the Related Art

Many systems have been developed to help sighted individuals with the task of writing and learning to write. The number of these systems has been increasing with the advance of technology. For example, autocorrect functions have been added to many applications such as word processing, email, calendar events and the like. These autocorrect functions may detect when a typed word is incorrectly spelled and may automatically correct the spelling within the application. Some autocorrect functions may also perform autofill functions such that the system predicts what a user is writing as the user types and automatically completes the word for the user.

Other systems include aids to help a student learn to write. These systems may observe the student typing and detect when a word is incorrectly spelled. In response to the detected incorrect spelling, the system may provide feedback including the correct way to spell the word.

These tools are useful but unfortunately cannot help blind individuals in the same manner that they can help sighted individuals. Blind individuals read and write using braille which is designed such that the individual can read using his sense of touch instead of vision. Braille includes various combinations of protrusions within a 3 by 2 cell with each combination of protrusions corresponding to a letter of the alphabet. Thus, in order to write braille, the user may write with the reading/writing substrate upside down (so the characters are reverse-oriented as written) so that the user can "poke" the protrusions into the paper and flip the substrate over in order to feel them. Some blind people start at the right side of the page and write in a forward direction (first letter of each word written first) or in a reverse direction (last character of each word written first). Because blind people comprise a minority of the population and because braille can be written in various manners, less time and effort has been spent developing systems for autocorrecting and/or teaching braille.

Thus, there is a need for systems and methods for teaching and/or autocorrecting braille.

SUMMARY

What is described is a braille teaching/autocorrecting system. The braille teaching/autocorrecting system includes a camera configured to detect image data corresponding to at least one braille character. The braille teaching/autocorrecting system also includes a processor coupled to the camera and configured to identify the at least one braille character based on the image data and determine feedback data based on the identification of the at least one braille character.

Also described is a braille teaching/autocorrecting system. The braille teaching/autocorrecting system includes a sensor configured to detect braille data corresponding to at least one reverse-oriented braille character. The braille teaching/autocorrecting system also includes a processor coupled to the sensor and configured to identify the at least one reverse-oriented braille character based on the braille data and determine feedback data based on the identification of the at least one reverse-oriented braille character.

Also described is a braille teaching/autocorrecting system. The braille teaching/autocorrecting system includes a sensor configured to detect braille data corresponding to at least one braille character. The braille teaching/autocorrecting system also includes a processor coupled to the sensor. The processor is configured to determine a direction in which the at least one braille character is being written based on the braille data. The processor is also configured to determine an orientation in which the at least one braille character is being written based on the braille data. The processor is also configured to identify the at least one braille character based on the braille data. The processor is further configured to determine feedback data based on the direction, orientation and identification of the at least one braille character.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 10A illustrates a phrase written using reverse-orientation braille characters;

FIG. 10B illustrates an exemplary use of the teaching mode blocks of the method of FIG. 9 for reverse-oriented braille written in a reverse direction according to an embodiment of the present invention;

FIG. 10C illustrates an exemplary use of the autocorrect mode blocks of the method of FIG. 9 for reverse-oriented braille written in a reverse direction according to an embodiment of the present invention; and FIG. 10D illustrates an exemplary use of the autocorrect mode blocks of the method of FIG. 9 for reverse-oriented braille written in a forward direction according to an embodiment of the present invention.

DETAILED DESCRIPTION

The systems and methods described herein provide autocorrecting and teaching functionality to individuals writing using braille. The systems and methods described herein provide several benefits and advantages such as being able to detect braille that is written by a user as the user is writing the braille and determine which braille character the user has written. The systems and methods also provide the advantage of assisting an individual in the learning of braille by providing feedback to the user as the user is writing the braille as well as autocompleting and autocorrecting braille as the user is writing it in order to save the user time while writing the braille. For example, a potential word determination may be made based on detected written characters, a number or percentage of times each word has been written by the user, which word or words fit contextually, whether a character of a misspelled word has locations selected that are similar to another character that is a potential word, whether the user uses a different pattern of writing to write different words or the like. Additionally, the processor is capable of determining feedback, autocompleting and autocorrecting braille when written in a forward or reverse-orientation and a forward or reverse direction, which provides the advantage of being usable by any braille writer regardless of their writing style.

An exemplary system includes a sensor that is capable of detecting braille as it is being written, such as a camera for detecting the location of a user's hand, stylus, etc. or a touchscreen for detecting contact corresponding to locations within a braille cell. The system also includes a memory for storing braille characters and words in reverse or forward-orientations. The system also includes a processor for determining which characters are being written by the user, determining a direction and an orientation of the braille writing and determining feedback to provide to the user based on the determined characters and the direction and orientation of the braille. The system also includes an output device for providing the feedback, such as speakers or a vibration unit.

Figure 1A:
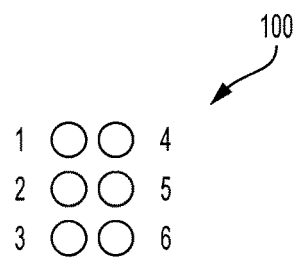
FIG. 1A illustrates a braille cell.

FIG. 1A illustrates a braille cell 100. The braille cell 100 includes three rows and two columns forming 6 locations: 1, 2, 3, 4, 5 and 6. Some of the locations may be selected (i.e., contain raised protrusions) such that different patterns of locations having protrusions correspond to different characters of the alphabet. A vision impaired individual can place one or more fingers on a braille cell and determine which character the braille cell corresponds to based on the pattern of raised locations.

Figure 1B:
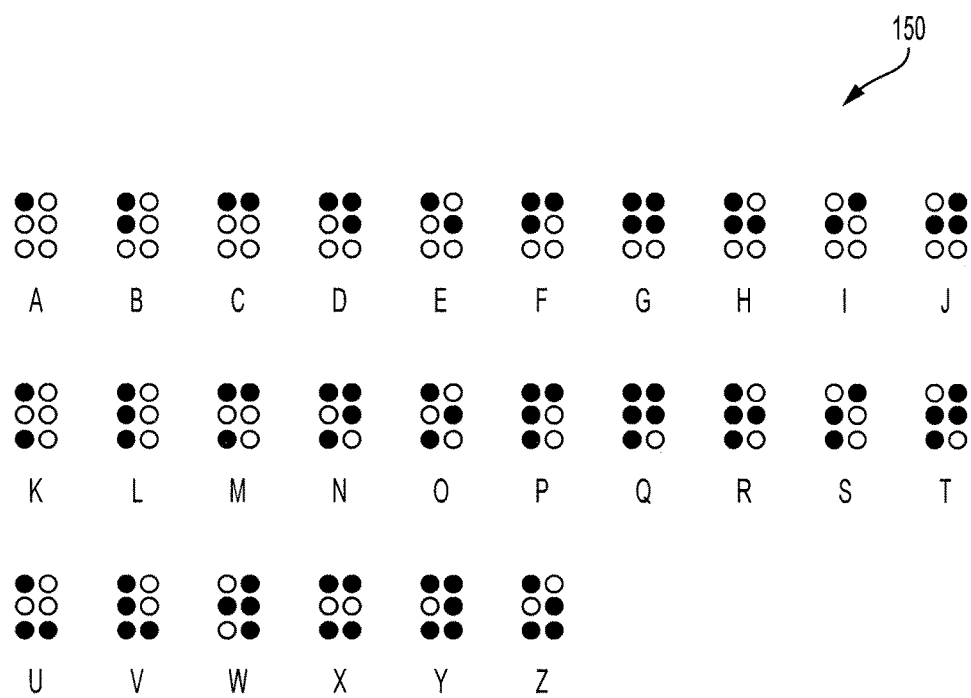
FIG. 1B illustrates the braille alphabet.

FIG. 1B illustrates the braille alphabet 150. Referring to FIGS. 1A and 1B, the letter "A" corresponds with a braille cell having only location 1 selected, the letter "B" corresponds with a braille cell having location 1 and location 2 selected, etc. Each selected location should include a protrusion extending away from the reading surface of the substrate towards the user. In other words, the braille reader should feel the protrusion of each selected location when reading rather than feeling an indention at the selected locations.

Most vision impaired individuals are taught to both read and write braille. When writing using braille, multiple braille characters may be positioned adjacent to each other such that the multiple braille characters correspond to a word. A space may be left between words to indicate the separation of words. It is preferable for each braille cell 100 to have the same size so that a reader can quickly scan his finger or fingers over the text without having to adjust for different sized cells.

Figure 2A:
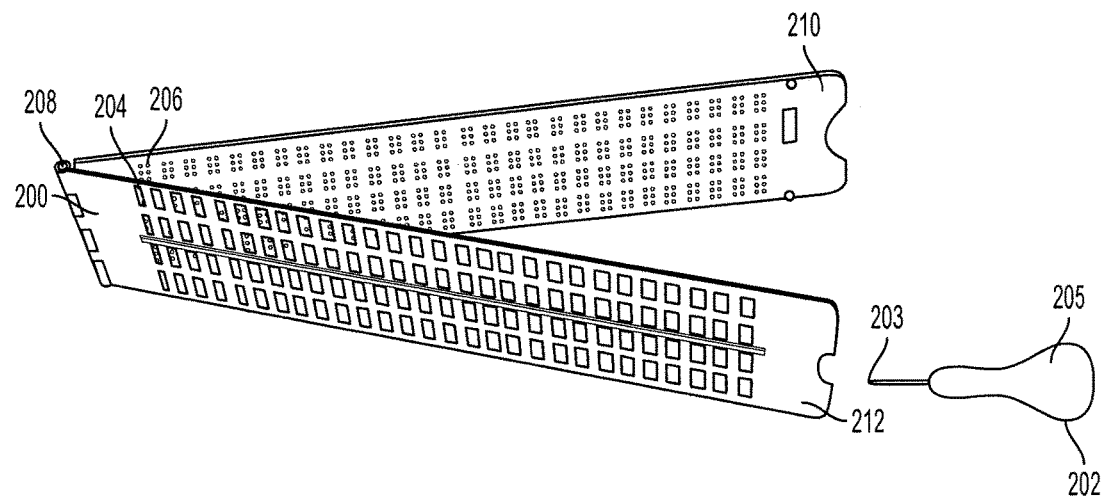
FIG. 2A illustrates a slate and a stylus that are designed for writing braille.

Special tools have been developed to simplify the process and to improve the quality of written braille. FIG. 2A illustrates a slate 200 and a stylus 202 that are designed for writing braille. The braille slate 200 includes a first plate 210 and a second plate 212. The plates are coupled together by a hinge 208. The stylus 202 includes a handle 205 coupled to a tip 203.

Before writing braille using the slate 200 and the stylus 202, a piece of paper or other substrate is placed between the first plate 210 and the second plate 212. The plates are then pushed together and may be coupled such that the paper or other substrate cannot easily become removed from the slate 200. The second plate 212 may define rectangular or other shaped holes 204 that correspond with a cell and define the cell size. The first plate 210 includes a plurality of indentions 206 such that six indentions 206 corresponding to the locations of a braille cell align with each rectangular hole 204.

In order to write the braille once the substrate is coupled to the slate 200, an individual may grasp the stylus 202 at the handle 205 and form indentions in the substrate by pressing the tip 203 through each rectangular hole 204 into each indention 206. By repetitively applying this method, a user may write multiple braille characters and multiple words using the slate 200 and the stylus 202.

Figure 2B:
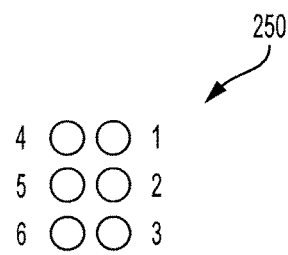
FIG. 2B illustrates a reverse-oriented braille cell.

When writing braille using the slate and stylus method, each braille character should be written in a reverse-orientation (i.e., reversing each location of the braille cell) as indicated in FIG. 2B, which illustrates a reverse-oriented braille cell 250. The reverse-orientation is required because the user is forming the raised location by pushing the tip 203 into the substrate such that the substrate must be flipped over to feel the selected locations.

Additionally, the braille should be written such that the first letter of the word begins on the far right of the line and the last letter is positioned on the far left of the line. As the substrate will be turned over before being read, this ensures that the braille can be read from left to right.

Figure 3A:
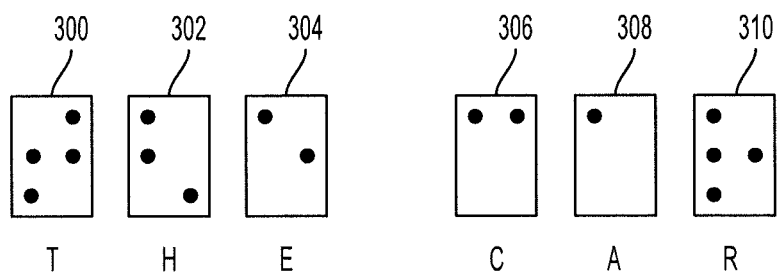
FIG. 3A illustrates a phrase "the car" written using braille.

FIG. 3A illustrates a phrase "the car" written using braille. Six braille cells 300, 302, 304, 306, 308 and 310 are used to write this phrase. In FIG. 3A, the selected locations of each cell will extend away from the page such that each raised location will be felt by placing a finger over the cell.

Figure 3B:
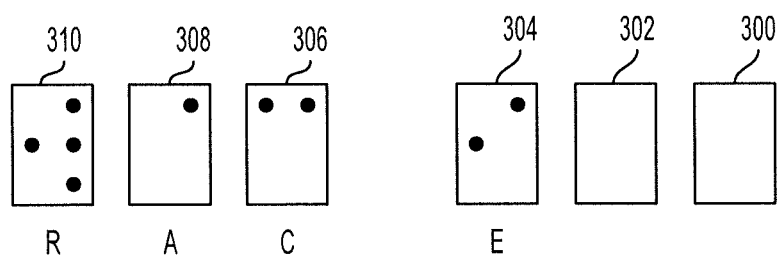
FIG. 3B illustrates one example of how an individual would write the phrase "the car" in braille.
Figure 3C:
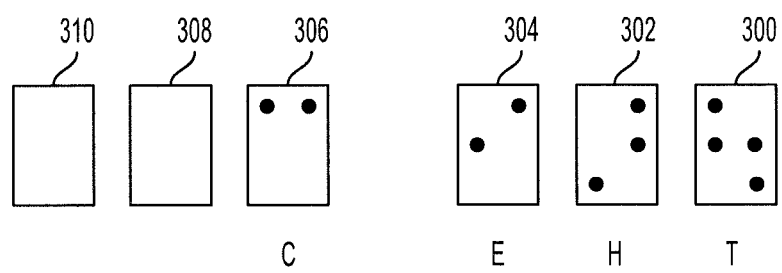
FIG. 3C illustrates another example of how an individual would write the phrase "the car" in braille.

As mentioned above, braille may be written such that each line starts on the right and ends on the left. FIG. 3B illustrates one example of how an individual would write the phrase "the car." As illustrated in FIG. 3B, the orientation of each braille cell is reversed and the phrase is written from right to left. Some individuals writing braille twill write in a reverse direction (i.e., begin at the left of the substrate with the last letter of the line), as illustrated in FIG. 3B. Some individuals will write in a forward direction (i.e., begin at the right of the substrate with the first letter of the line, as illustrated in FIG. 3C).

Figure 4A:
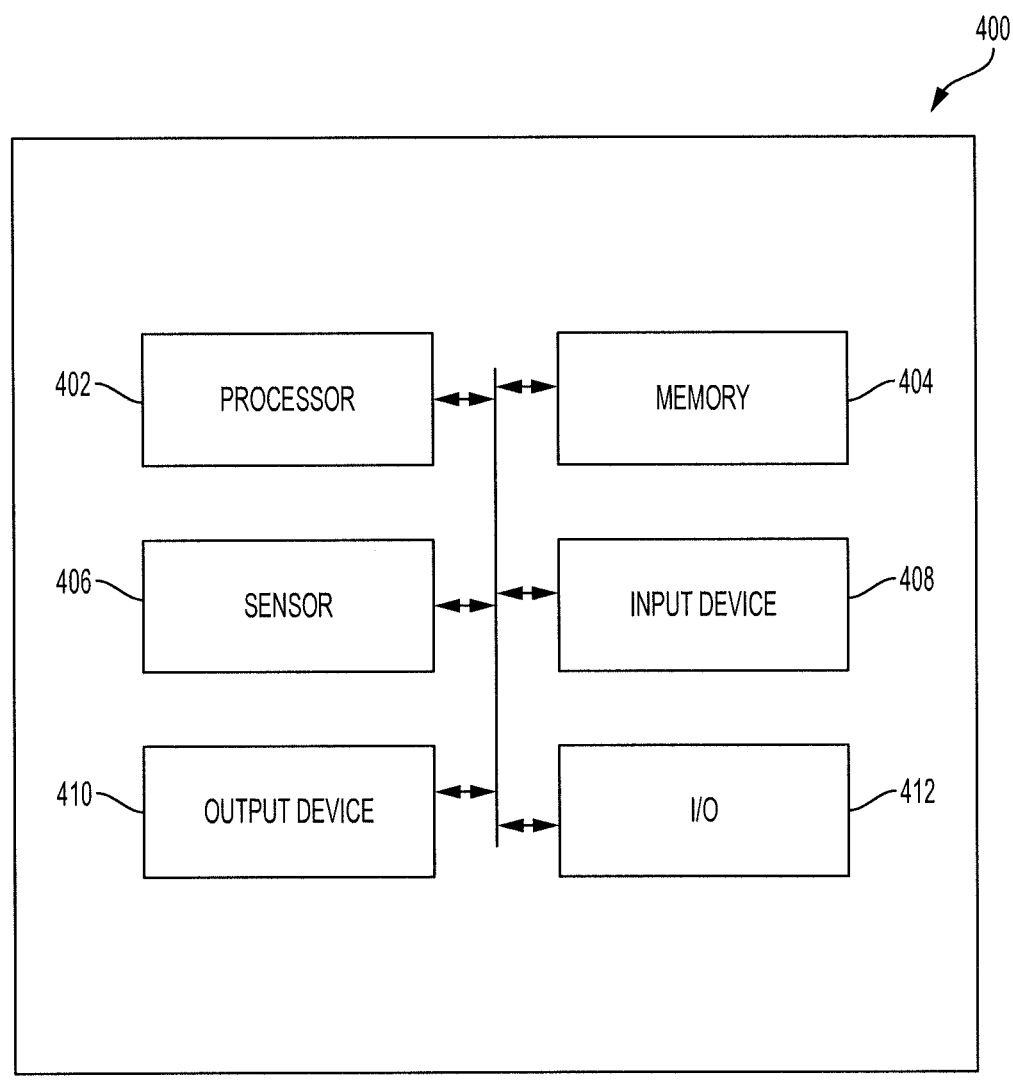
FIG. 4A illustrates a braille teaching/autocorrecting device capable of auto correcting a user who is writing braille and/or teaching braille to a user according to an embodiment of the present invention.

FIG. 4A illustrates a braille teaching/autocorrecting device 400 capable of auto correcting braille as a user is writing it and/or teaching braille to a user. The teaching/autocorrecting device 400 can be a mobile device such as a laptop, a tablet, a wearable smart device, a stationary device such as a desktop computer or the like. The teaching/autocorrecting device 400 includes a processor 402, a memory 404, a sensor 406, an input device 408, an output device 410 and an I/O port 412. Each component may be in electrical communication with one another, as illustrated. The teaching/autocorrecting device 400 may include any combination of the above components and/or may include additional components not illustrated.

The processor 402 may include a computer processor such as an ARM processor, DSP processor, distributed processor or other form of central processing. The processor 402 may be local (i.e., positioned in/on the teaching/autocorrecting device 400), may be remote (i.e., positioned remote from the teaching/autocorrecting device 400), or it may be a pairing of a local and a remote processor. The processor 402 may be capable of determining braille characters that have been and/or are being written by a user based on data detected by the sensor 406. The processor 402 may also be capable of determining feedback to provide to the user based on the determined braille characters.

The memory 404 may include one or any combination of a RAM or other volatile or nonvolatile memory, a non-transitory memory or a data storage device, such as a hard disk drive, a solid state disk drive, a hybrid disk drive or other appropriate data storage. The memory 404 may store machine-readable instructions which may be executed by the processor 402. As with the processor 402, the memory 404 may be local, remote or a pairing of local and remote.

The sensor 406 may include any sensor capable of detecting braille writing over a period of time. For example, the sensor 406 may include a camera capable of detecting the position of a tip of a stylus, the position of a user's hand, indentions in a substrate or the like in order to determine each location selected by a user.

Detection of indentions in a substrate includes different techniques than detection of typical characters on a substrate using an optical character recognition (OCR) system. Typical OCR systems are designed to ignore small marks on a page. This removal would not work for braille, as each indention may be detected and ignored as a small mark. Accordingly, in order to detect indentions, a preferable method may include magnifying the small marks and ignore the larger marks.

In some embodiments, the sensor 406 may include a touchscreen having different areas corresponding to locations of a braille cell, an electronic circuit having areas corresponding to each location of a braille cell such that a touch in each location closes a circuit and indicates a selection of the location, or the like.

The input device 408 may include any input device such as a mouse, a track pad, a microphone, one or more buttons, a pedal, a touchscreen and/or the like. The input device 408 may be adapted to receive input from a user corresponding to a function of the teaching/autocorrecting device 400. For example, a user may toggle between an autocorrect mode or a teaching mode using the input device 408.

The output device 410 may include a speaker, a vibration unit, a display, a touchscreen and/or the like. The output device 410 may output data indicating one or more options for autocorrecting as a user begins to write braille, it may output data indicating whether a user is writing braille correctly, it may output data indicating potential improvements to a user's writing or the like.

Using the teaching/autocorrecting device 400, a user may write braille and the sensor 406 may detect the braille as the user is writing it such that the sensor 406 may detect each selected location of each braille cell as it is selected by the user, it may detect each portion of a braille character, each braille character, each word or group of words or any combination of the above after they are completed. As the user is writing, the processor 402 may predict one or more potential autocorrect words based on what the user has already written. Using the output device 410, the teaching/auto correcting device 400 may output the one or more potential words after the user has written at least one character. Using the input device 408, the user may inform the teaching/autocorrecting device 400 whether a potential word is the correct word. Based on the user's response, the processor 402 completes the word for the user.

The I/O port 412 may include one or more ports adapted to allow communications between the teaching/autocorrecting device 400 and another device. For example, the I/O port 412 may include a headphone jack, a data port, a wireless antenna, a 3G or LTE chip or the like. In some embodiments, one or more of the components of the teaching/autocorrecting device 400 may be positioned remote from the teaching/autocorrecting device 400. These components may communicate with one another and with the onboard components via the I/O port 412. For example, the teaching/autocorrecting device 400 may have an onboard processor and a memory. A camera, a wireless mouse and a speaker may be remote from the teaching/autocorrecting device 400 and coupled to each other and the processor and the memory via the I/O port 412.

In some embodiments, the I/O port 412 may allow communications between a computing device and the teaching/autocorrecting device 400 such that the teaching/autocorrecting device 400 may determine characters, words, sentences or the like and transmit them via the I/O port 412 to the computing device. The computing device may then cause the characters, words, sentences, etc. to become inserted into an application such as email, web browser, word processing or the like.

Figure 4B:
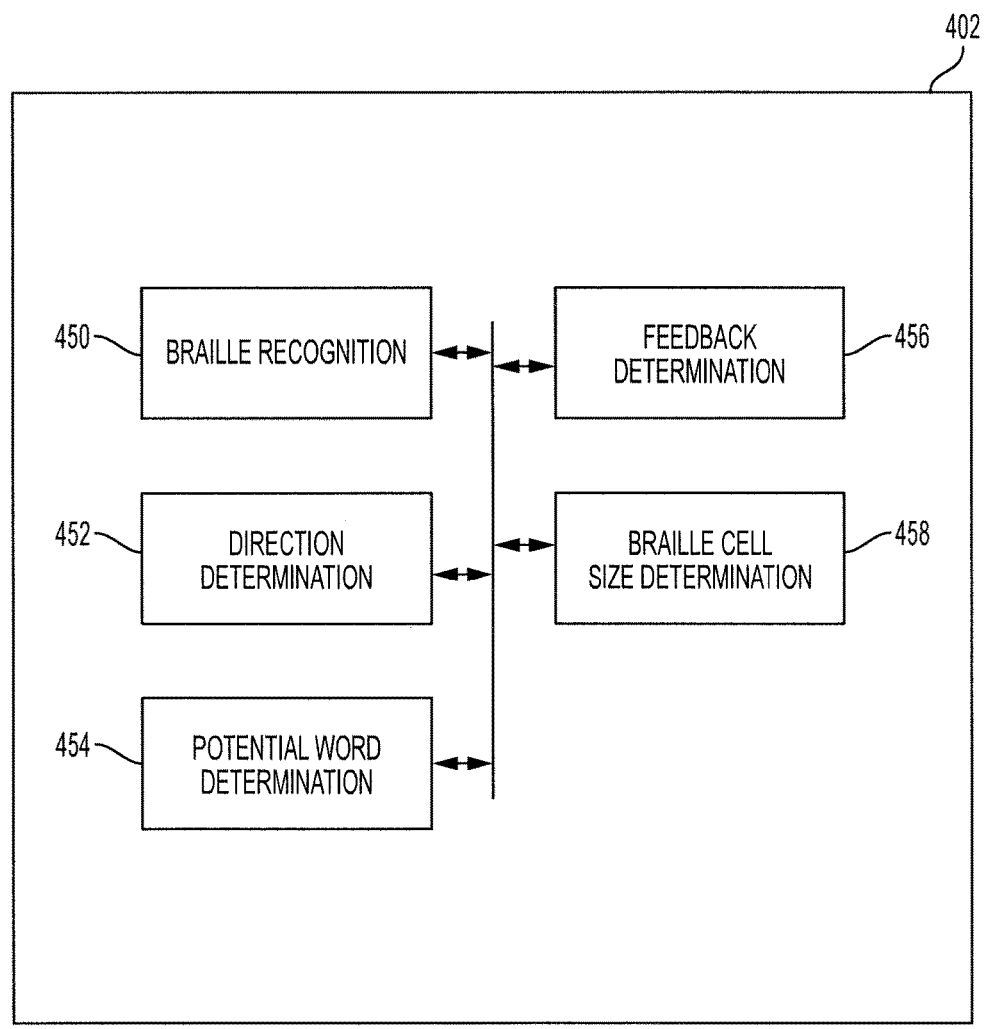
FIG. 4B illustrates a block diagram of a processor of the device of FIG. 4A including multiple modules according to an embodiment of the present invention.

FIG. 4B illustrates a block diagram of the processor 402 including multiple modules. The processor 402 includes a braille recognition module 450, a direction determination module 452, a potential word determination module 454, a feedback determination module 456 and a braille cell size determination module 458. Each module may be in electrical communication with one another, as illustrated in FIG. 4B. The processor 402 may include any combination of the above modules and/or may include additional modules not illustrated.

The braille recognition module 450 is adapted to recognize braille characters as they are being written. The sensor 406 may detect data that corresponds to braille data, such as a set of indentions corresponding to braille cell locations, the location of a user's hand and/or the location of a tip of a stylus, and transmit the detected data to the processor 402. In some embodiments, the braille recognition module 450 may determine selected characters and/or locations by the user simply tapping a stylus on the desired location. The braille recognition module 450 may receive this detected data from the sensor 406 and determine which characters are being written based on the received data. The braille recognition module 450 may be adapted to identify braille characters written in a reverse-orientation, as they would be written by a user, or characters written in a forward-orientation, as they would be read by a user.

The direction determination module 452 may receive the data detected by the sensor 406 and/or the data generated by the braille recognition module 450 and determine whether the characters are being written as forward-oriented or reverse-oriented. The direction determination module 452 may also determine in which direction the braille is being written based on the received data (i.e., if reverse-oriented, whether the braille is being written in a forward direction from right to left or a reverse direction from left to right).

The potential word determination module 454 may be adapted to determine potential words that a user is writing and/or has written. The potential word determination module 454 may receive data including recognized characters from the braille recognition module 450 and/or a direction of the braille characters and/or the braille lines from the direction determination module 452. Based on the received data, the potential word determination module 454 may determine potential words based on partially written words and/or misspelled words.

In the example of FIG. 3B, the teaching/autocorrecting device 400 may detect the written braille characters in cells 304, 306, 308 and 310. The braille recognition module 450 may identify the written characters and the direction determination module 452 processor 402 may indicate that the braille is being written in a reverse-orientation and in a reverse direction. This data may be provided to the potential word determination module 454 which may determine that at least one potential word to be filled in cell 300, cell 302 and cell 304 might be the word "the" based on the letter "E" in cell 304.

If the same or a similar system detected the characters in FIG. 3C, the potential word determination module 454 may determine that the word to be written in cells 306, 308 and 310 of FIG. 3C may be "car" based on the letter "C" being written in cell 306. As writers of braille do not always write in the same directions, it is advantageous for the teaching/autocorrecting device 400 to be able to process detected braille characters and lines regardless of the orientation or direction as it can be used for all braille writers.

The potential word determination module 454 may be adapted to autocomplete a partially written word and/or correct misspelled words. The potential word determination module 454 may compare detected characters to a database of words to determine which word or words are potential words based on the determined characters. A module of the processor 402 may convert braille characters into other characters (i.e., the English alphabet) before processing (i.e., comparing the detected characters to words in a database) and/or the processor 402 may process the data without converting the braille characters. The potential word determination may be made based on detected written characters, a number or percentage of times each word has been written by the user, which word or words fit contextually, whether a character of a misspelled word has locations selected that are similar to another character that is a potential word, whether the user uses a different pattern of writing to write different words or the like.

In some embodiments, the potential word determination module 454 may predict a likelihood of each potential word being the correct word and rank the potential words based on the predicted likelihood. In some embodiments, the processor 402 may only output the highest ranked potential word. The user may then provide feedback via the input device 408 and/or the sensor 406 indicating whether the potential word is the correct word. In some embodiments, the potential word determination module 454 may output a plurality of potential words (such as the 3 highest ranked potential words, the 5 highest ranked potential words or the like). The user may select one of the potential words using the input device 408 and/or the sensor 406. For example, the user may tap the stylus, hold his hand in a certain position, click a mouse or the like in response to hearing the correct word to indicate that the most recent potential word is the correct word.

The feedback determination module 456 may be adapted to determine feedback to provide to the user based on data from the other modules. For example, if the user has selected a learning mode, the feedback determination module 456 may provide feedback every time a user writes a word correctly and/or incorrectly. The feedback may include a correct spelling of the word, correct dot placement within the cell for each character, an indication that the word is spelled wrong and the user should try again, that the sentence structure is incorrect, that incorrect punctuation is used or the like.

The feedback determination module 456 may also determine which, if any, potential words to provide to the user when the teaching/autocorrecting device 400 is in the autocorrect mode. For example, the feedback determination module 456 may include a user selectable setting (or a programmed setting) regarding a number of potential words (N) for the user to receive. The feedback determination module 456 may determine to output the N highest ranked potential words and provide data to the output device 410 causing the output device 410 to output the N highest ranked potential words.

The feedback determination module 456 may also determine a format in which the feedback will be provided to the user. The teaching/autocorrecting device 400 may include more than one output device 410, such as a speaker and/or a vibration unit. The feedback determination module 456 may determine whether to provide audio feedback and/or haptic feedback based on a number of factors. These factors may include which type of sensor 406 is being used, an ambient sound detected around the teaching/autocorrecting device 400, whether the user is in contact with the vibration unit, if the user has selected a preference or the like.

The braille cell size determination module 458 may be adapted to determine a size of the braille cells that the user is writing in based on data detected by the sensor. This determination may be made in different ways. For example, the teaching/autocorrecting device 400 may include two elongated members that the user may place together in an "L" shape that indicate the size of the braille cell. In some embodiments, the user may place two fingers together in an "L" shape to indicate the size of the braille cell. The sensor 406 may detect the "L" shape and the braille cell size determination module 458 may determine that the braille cell size is defined by a rectangle defined by an area within the "L" shape.

For example, the user may draw a rectangle using the stylus, a pen, a pencil or the like on a piece of paper to indicate the size of the braille cell. In embodiments where the sensor 406 is a touchscreen or an electronic circuit, the user may draw a rectangle and/or an "L" shape using a finger, a stylus, a pencil, a pen or the like indicating the size of the braille cell. In some embodiments, the user may begin to write and the processor 402 may determine the cell size based on the locations in which the user is selecting.

Figure 5:
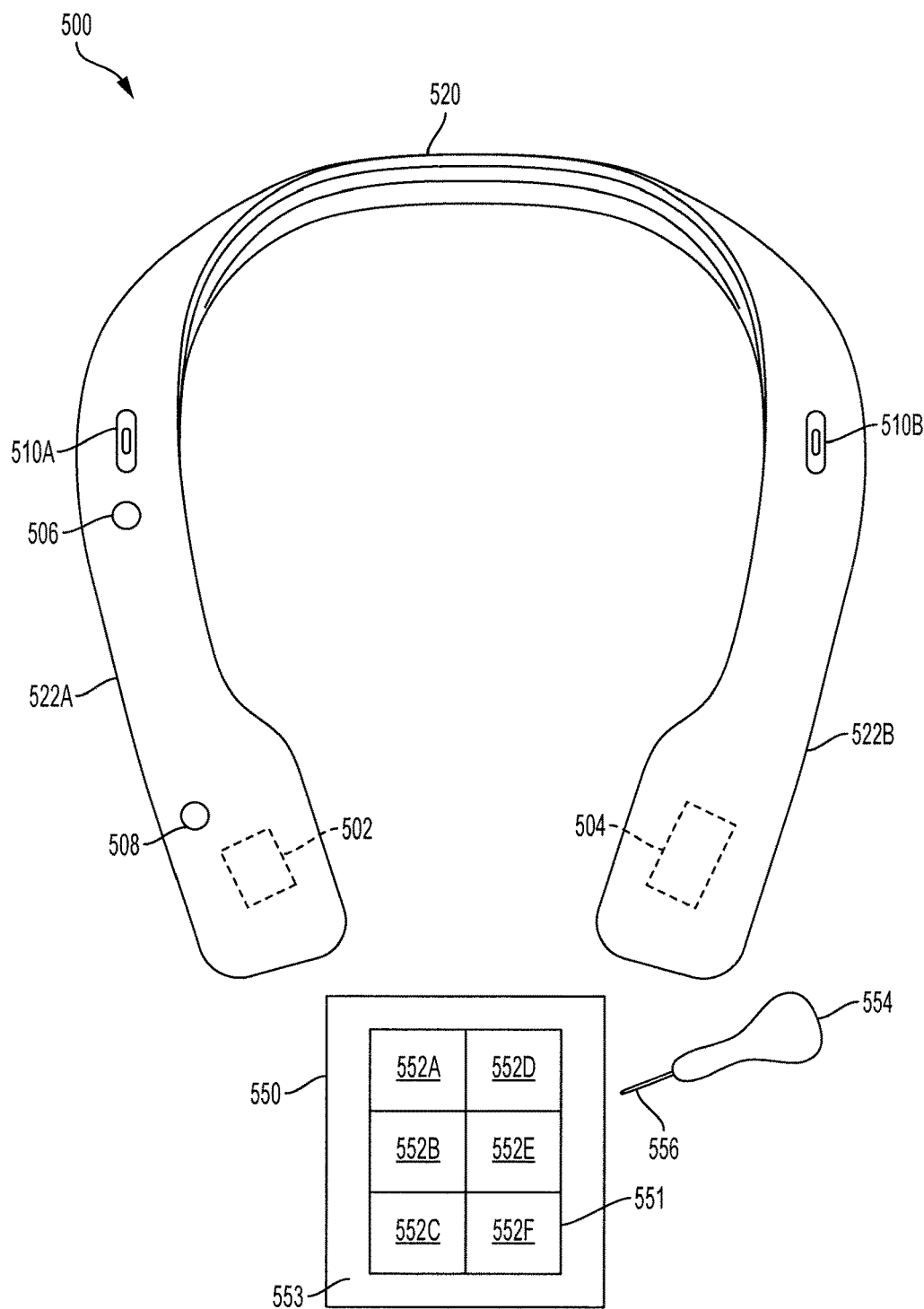
FIG. 5 illustrates a smart necklace which can be used for teaching and/or autocorrecting braille according to an embodiment of the present invention.

FIG. 5 illustrates a smart necklace 500 which is an exemplary embodiment of the teaching/autocorrecting device 400. The smart necklace 500 is designed to be worn around a user's neck. A top portion 520 is to be positioned behind the user's neck. A first side portion 522A may be adapted to cross over a user's shoulder and rest on the front of the user's shoulder. A second side portion 522B may be adapted to cross the user's other shoulder and rest in front of the user's other shoulder.

The smart necklace 500 may include a processor 502, a memory 504, a camera 506, a button 508, a first output unit 510A, a second output unit 510B and a battery (not shown). The smart necklace 500 may include any combination of the above components and/or may include additional components not illustrated. The processor 502 and the memory 504 may be similar to the processor 402 and the memory 404 of the teaching/autocorrecting device 400 and may be positioned on the smart necklace 500. The camera 506 may be any camera capable of detecting image data, such as the location of a user's hand, the location of a tip 556 of a stylus 554, an indentation on a substrate 550 or the like.

As an exemplary use of the smart necklace 500, a blind user wearing the smart necklace 500 may define a cell area on a substrate 550 by outlining a rectangle defining a cell 551 with the tip of the stylus 554. The camera 506 may detect this outline and the processor 502 may determine that the outline corresponds to a cell size. The processor may then divide the cell 551 into the 6 locations 552A, 552B, 552C, 552D, 552E and 552F of the cell 551.

The user may then begin to write in braille on the substrate 550 by touching the tip 556 of the stylus 554 to the substrate 550, by pushing the tip 556 of the stylus 554 into the substrate 550 causing indentions or the like. The substrate 550 may be a piece of paper, a sheet of metal or plastic or any other substrate. As the tip 556 of the stylus 554 approaches each location within the cell of the substrate 550, the processor 502 may determine that the location has been selected based on data detected by the camera 506. For example, the processor 502 may determine that a location has been selected when the image data received from the camera 506 indicates that the tip 556 is within a predetermined distance of the substrate 550. The tip 556 may be colored with a predetermined color so that the processor 502 can easily determine the location of the tip 556 relative to the substrate 550. In some embodiments, the processor 502 may determine that a location has been selected based on a detected position or location of the user's hand and/or detect indentions in the substrate 550 formed by the stylus 554.

The user and/or the processor 502 may define the cell size so that only one cell can fit on a surface 553 of the substrate 550 or so that many cells can fit on the surface 553 of the substrate 550. In FIG. 5, the cell size is defined such that only the cell 551 fits on the surface 553 of the substrate 550.

The processor 502 may store the character in the memory 504 in response to identifying the character. The processor 502 may be adapted to determine when the present character is complete based on detected data from the camera 506 such as a particular action being performed with the stylus 554, a tap of the user's finger, a selection of locations that corresponds with a character but cannot correspond to another character with additional selected locations or the like. The processor 502 may also be adapted to determine when a word is complete based on a detected space between cells, a particular action being performed with the stylus 554, a tap of the user's finger or the like. These features are particularly advantageous when the cell size is such that only one cell 551 can fit on the surface 553 so that the user can quickly proceed to the next cell and/or the next word.

The button 508 is an input device configured to receive an input from the user. The user may select an autocorrect mode or a teaching mode, may turn the smart necklace 500 on or off or further manipulate the functionality of the smart necklace 500 using the button 508. In some embodiments, the smart necklace 500 may include more than one button and/or a different input device, such as a toggle switch, a haptic strip, a touchscreen or the like.

The output units 510A and 510B may each include a speaker and/or a vibration unit. In some embodiments, the output units 510A and 510B may include both a speaker and a vibration unit. In some embodiments, the smart necklace 500 includes only one output unit which may provide audio and/or haptic output.

Figure 6:
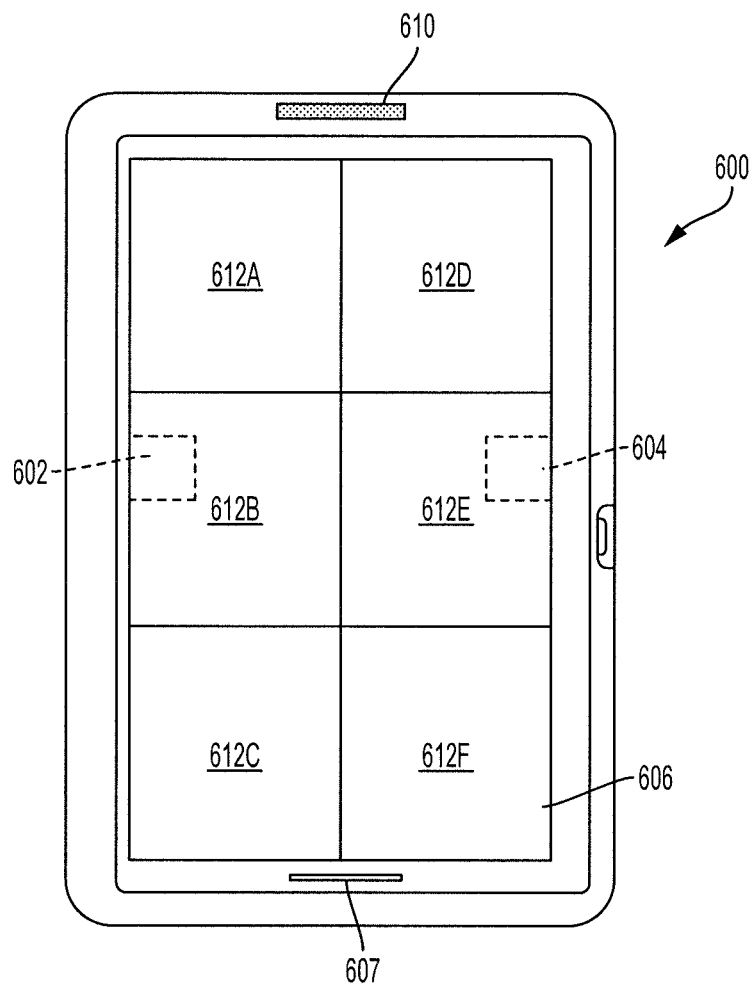
FIG. 6 illustrates a smart mobile device, such as a tablet or a mobile telephone, which can be used for teaching and/or autocorrecting braille according to an embodiment of the present invention.

FIG. 6 illustrates a smart mobile device 600, such as a tablet or a mobile telephone. The smart mobile device 600 may include a processor 602, a memory 604, a touchscreen 606, a microphone 607 and a speaker 610. The processor 602 and the memory 604 may be similar to the processor 402 and the memory 404 of the teaching/autocorrecting device 400.

The touchscreen 606 may be adapted to receive user input via contact from a portion of a user's body, a stylus or another device. The touchscreen 606 may be divided into a location 612A, 612B, 612C, 612D, 612E and 612F that correspond to locations of a braille cell. Contact may be made with each location to indicating a selection of the location. After selecting desired locations, the user may indicate that he or she is finished with the character by performing an action, such as double tapping the touchscreen 606, swiping his finger in a particular manner or the like.

The microphone 607 may be an input device. A user may select between modes of the smart mobile device 600 by verbally speaking a command. A user may also indicate completion of a word, a desire to start a new sentence or another word processing request by verbally indicating the request. The microphone 607 may detect the speech data and transmit it to the processor 602, which may in turn determine the request and perform it.

The processor 602 may be adapted to determine a direction in which the user is writing and/or an orientation in which the user is writing. For example, a first user may write an F by selecting location 612A, location 612B and location 612D. In response, the processor 602 may determine that the user is writing in a forward-orientation. Another user may be used to writing braille as he would with a slate and stylus and instead write the letter F by selecting location 612A, 612D and 612E. The processor 602 may determine that this individual is writing in a reverse-orientation. After one or more characters have been entered by the user, the processor 602 may also determine in which direction the user is writing. The processor 602 may autocorrect and/or teach braille based on the detected input as well as the determined direction and orientation of the writing. The processor 602 may also determine feedback to be provided to a user via the speaker 610.

The memory 604 may store each selected location, character, finished word or the like as it is completed. The selected locations/characters/words/etc. may be displayed on a display, such as the touchscreen 606 or another display, or they may be later accessed by the processor 602 for printing, emailing, additional word processing or the like.

Figure 7:
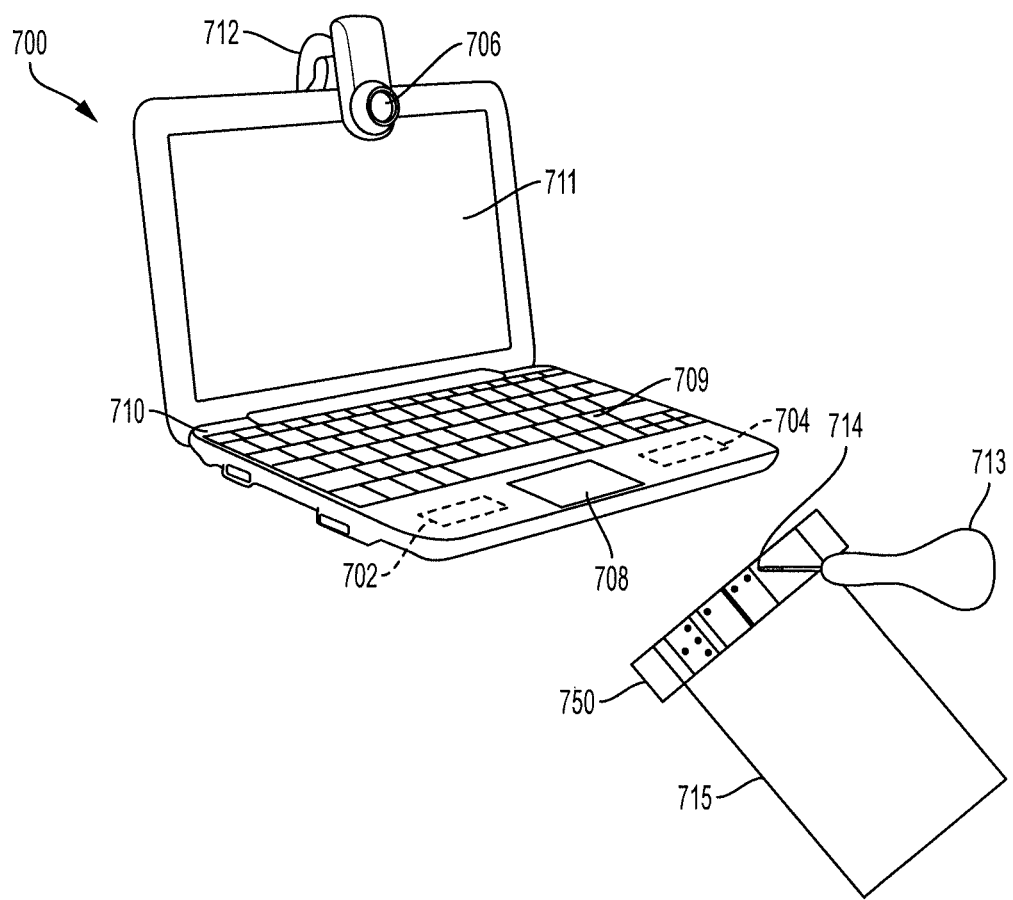
FIG. 7 illustrates a laptop which can be used for teaching and/or autocorrecting braille according to an embodiment of the present invention.

FIG. 7 illustrates a laptop 700 that may be used to teach and/or autocorrect braille. The laptop 700 includes a processor 702, a memory 704, a track pad 708 as an input device and a speaker 710 as an output device. The laptop 700 is coupled to a camera 706 by a cable 712. The cable 712 may be coupled to an I/O port of the laptop 700 such as a USB port, a wired communication port capable of communicating via cables or wires and defined at least in part by IEEE 1394 (e.g., the Firewire™ protocol), a wireless communications port capable of communicating using short wavelength UHF radio waves and defined at least in part by IEEE 802.15.1 (e.g., the BLUETOOTH™ protocol) or the like. The processor 702 and the memory 704 may be similar to the processor 402 and the memory 404 of the teaching/autocorrecting device 400. The camera 706 may be coupled to the processor 702 and adapted to detect image data including movement of a stylus 713, movement of a tip 714 of the stylus 713, movement of a user's hand, indentions left on a substrate 715 and/or the like.

The processor 702 may receive this detected image data and perform autocorrecting and/or teaching functions based on the detected image data. In the embodiment illustrated in FIG. 7, the tip 714 of the stylus 713 is colored with a special coloring. The processor 702 may be adapted to distinguish the color of the tip 714 from other colors so that the processor 702 can easily determine the location of the tip 714 relative to the substrate 715. In some embodiments, the camera 706 may include a special lens and/or filter that is adapted to detect the coloring of the tip 714 so that it can be detected more easily.

In the embodiment illustrated in FIG. 7, the substrate 715 is enclosed in a slate 750. The user is writing across the substrate 715 in a reverse direction and with reverse-oriented braille characters. The camera 706 will detect the characters and transmit the image data to the processor 702, which will determine that the user is writing in a reverse direction and with reverse-oriented characters. The processor 702 may perform autocorrecting and/or teaching functions based on the reverse direction and reverse-oriented characters. Had the user been writing in a forward direction and/or with forward-oriented characters, the processor 702 would perform autocorrect and/or teaching functions based on the forward direction and/or the forward-oriented characters. The processor 702 may also determine feedback data to be provided via the speakers 710.

A user may input data to the laptop 700 using the track pad 708 and/or the keyboard 709. In some embodiments, the user may be able to select modes of the laptop 700 using the track pad 708 and/or the keyboard 709. For example, a user may select between an auto correct mode and a teaching mode, between a basic teaching mode and an advanced teaching mode, etc.

The memory 704 may store selected locations, written characters and/or written words and the processor 702 may perform functions with the stored writing, such as send a message as an email or a text, cause the characters and/or words to be output by the display 711, etc. For example, as the user writes braille on the substrate 715, the laptop 700 may display the corresponding characters on the display 711 using a braille format and/or an alphabetical format.

A teacher or other observer may be able to observe the progress of a user via the display 711. For example, in a teaching mode, the display 711 may indicate how well the user is learning by displaying a percentage correct, a number of misspelled words and/or miswritten characters, etc.

Figure 8:
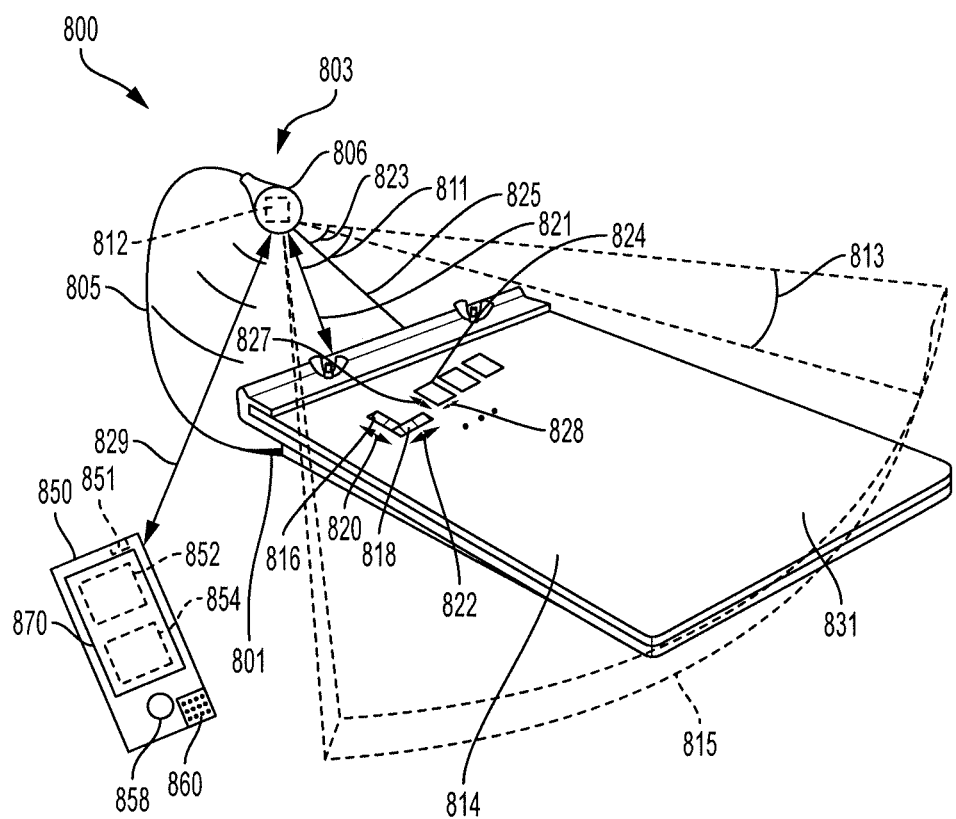
FIG. 8 illustrates another system for teaching and/or autocorrecting braille including a camera remote from a smart device according to an embodiment of the present invention.

FIG. 8 illustrates a system 800 for teaching/autocorrecting braille. The system 800 includes a mobile device 850 and an imaging unit 803. The mobile device 850 includes a processor 852, a memory 854, a display 870, a button 858, a speaker 860 and an antenna 851. The mobile device 850 may also be considered a computing device as it includes a processor and can perform computing functions. In that regard, any device capable of performing computing functions may be regarded as a computing device. The processor 852 and the memory 854 may be similar to the processor 402 and the memory 404.

The button 858 may be used as an input device for operation of the mobile device 850. The speaker 860 may be configured to provide audio data based on signals received from the processor 852. The display 870 may be adapted to output image data based on signals received from the processor 852. The antenna 851 may be coupled to the processor 852 and/or an I/O port and be capable of transmitting and receiving signals from another device having an antenna. The imaging unit 803 may include a camera 806, a connection means 801, a connector 805 coupling the camera 806 to the connection means 801 and an antenna 812.

The connection means 801 may be any connection means capable of connecting to a writing base such as a substrate, a clipboard, a notebook or the like. In some embodiments, the connection means 801 may be a clip, a bracket, a snap connector, a patch of hook and loop fasteners, commonly available under the tradename Velcro™, or the like.

The connector 805 may couple the connection means 801 to the camera 806. In some embodiments, the connector 805 may be partially flexible such that the location and direction of focus of the camera 806 may be physically changed by repositioning the connector 805. When the camera 806 is in a desired position, the connector 805 may resist movement until a sufficient force is exerted on the connector 805. In this way, a user may place the camera 806 in a position in which the camera can optimally detect image data associated with a user writing braille. The processor 852 may detect image data and determine a preferred position of the camera 806. The processor 852 may then instruct the speaker 860 to output feedback instructing the user on the preferred position of the camera 806.

The antenna 812 may be capable of communicating with the antenna 851 as indicated by the connection 829. Image data detected by the camera 806 may be transmitted to the mobile device 850 via the antenna 812 and received at the mobile device 850 via the antenna 851.

In some embodiments, the camera 806 may have a relatively small field of view (FOV) 815. This may allow the camera 806 to more accurately detect image data within the field of view of the camera 806. In the embodiment illustrated in FIG. 8, the substrate 814 is positioned within the FOV 815. The FOV 815 may extend horizontally at an angle 811 and vertically at an angle 813. The angle 811 may be larger than the angle 813 so that a majority of the FOV 815 is directed to the top surface 831 of the substrate 814.

As illustrated, the FOV 815 includes the entire top surface 831 of the substrate 814. However, the FOV 815 does not include much space beyond the top surface 831 of the substrate 814. This allows the camera 806 to detect more detailed image data proximate the top surface 831 of the substrate 814.

The camera 806 may be positioned a distance 821 above the substrate 814. The distance 821 may be selected such that an angle 823 formed between a line perpendicular to the top surface 831 and a center of focus 825 of the camera 806 is relatively small. This allows the camera 806 to detect the location of a finger, a stylus or the like relative to the top surface 831 of the substrate 814 without obstructions, such as the user's hand, finger or the like.

The system 800 may also include a first longitudinal member 816 and a second longitudinal member 818. The longitudinal members 816 and 818 may be adapted to be altered such that a longitudinal distance 820 and a longitudinal distance 822 of the longitudinal members 816 and 818 may be changed. A user may place the longitudinal members 816 and 818 on the substrate 814 adjacent and perpendicular to each other. The camera 806 may detect the longitudinal members 816 and 818 and the processor 852 may determine the size of each cell 824 based on the longitudinal distance 820 and the longitudinal distance 822.

The cell 824 illustrates an area having a height 827 and a width 828 that corresponds to the longitudinal distance 820 and the longitudinal distance 822 of the longitudinal members 816 and 818. By setting the dimensions of the cell 824 using the longitudinal member 816 and the longitudinal member 818, a user may select any desirable cell size for the braille cells.

Figure 9:
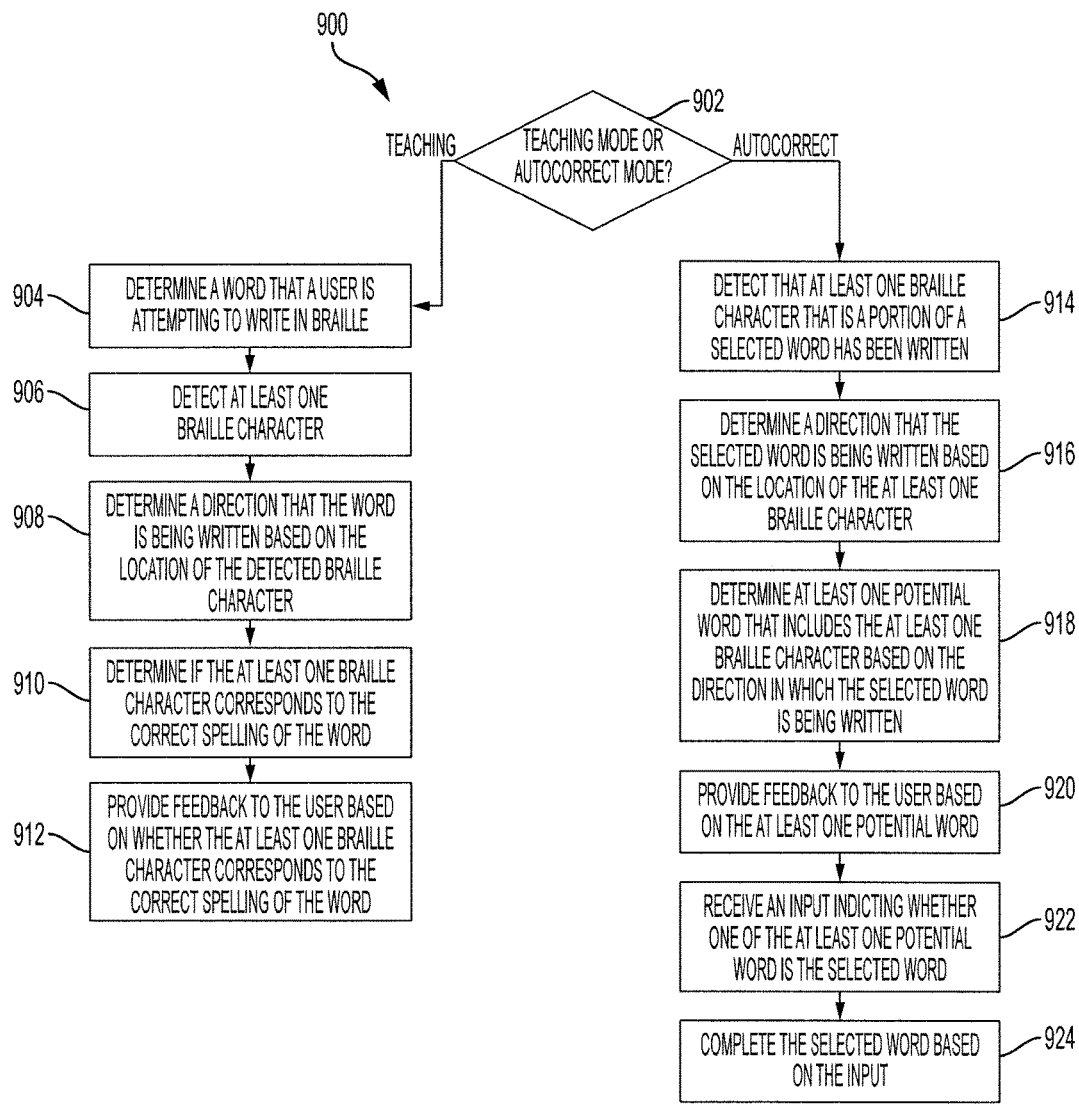
FIG. 9 illustrates a method to be performed by a processor of a device for teaching and/or autocorrecting braille according to an embodiment of the present invention.

FIG. 9 illustrates a method 900 to be performed by a processor of a device, such as the processor 402 of the teaching/autocorrecting device 400. The method 900 starts in block 902 where the processor determines if the teaching mode or the auto correct mode is selected based on data received at an input device, such as a button, a microphone and/or a camera.

If the teaching mode is selected, the method 900 proceeds to block 904. In block 904, the processor may determine a word that a user is attempting to write in braille. In some embodiments, the processor may include a list of words associated with a particular learning level, such as basic, intermediate or advanced, and output a word or sentence from the list to the user via an output device so the processor knows which word the user is attempting to write. In some embodiments, a user may input a word or a group of words that he or she would like to write so that the processor knows which word the user is attempting to write. In some embodiments, the processor may not determine a word that a user is attempting to write before the user begins to write. For example, the user may wish to practice writing and start writing in braille. As the user is writing, the processor may determine the word that the user is attempting to write as the user is writing the word or after the user has written the word.

In block 906, the sensor detects data corresponding to at least one braille character. The sensor may then transmit the detected data to the processor which may determine which braille character is written based on the detected sensor data. In some instances, the processor may not be capable of determining which braille character has been written until at least two characters have been written, as one braille character written in a reverse-oriented manner may be the same as another braille character written in a forward-oriented manner. In these instances, the method 900 may proceed or it may remain at this block until the character can be determined.

In block 908, the processor may determine a direction that the word is being written and/or the orientation of the braille character. This may be determined based a known word (if the word the user is attempting to write is known), on a comparison of the written character to forward-oriented and/or reverse-oriented braille characters, on the location of the initial braille character or the like.

In some embodiments, the user may enter braille characters one at a time on a single cell (such as using the smart mobile device 600). The processor may determine the direction that the word is being written based on the orientation of the character and how the word is being spelled. For example, if the user is attempting to spell "car," the processor may determine that the word is being written in a forward direction if the user writes the braille character for "C" first and may determine that the word is being written in a reverse direction if the user first writes the character for "R." In other embodiments, the device may include a forward/reverse setting such that the user can select whether the writing will be in the forward or reverse direction and/or the forward or reverse orientation.

In block 910, the processor determines if the at least one braille character corresponds to the correct spelling of the word that the user is attempting to write. As the processor detects each braille character, it may compare the detected characters to the correct spelling of the word. This can be done in any writing style—forward or reverse writing and/or forward or reverse-oriented characters.

In order to determine if the word is misspelled, the processor needs to know the direction in which the word is being written and the orientation of the braille characters. In some embodiments, more than one braille character must be recognized before this determination can be made. With brief reference to FIG. 1B, some braille characters are mirror images of each other, such as the braille characters corresponding to "H" and "J", so the processor may not know whether the user intended to write an "H" or a "J" until additional characters are detected in order to know a direction of writing.

The processor may also compare the selected locations of each written character to the correct locations corresponding to the correct writing of the character. The processor can determine if incorrect locations are selected and/or if correct locations are not selected for the character. This can be done in any writing style—forward or reverse writing and/or forward or reverse-oriented characters. If the user selects locations that do not match the correct locations, the processor may determine to provide feedback informing the user of the incorrect locations.

In block 912, the processor may determine feedback to be provided to the user based on whether the at least one braille character corresponds to the correct spelling of the word and/or the correct locations are selected for each character. In some embodiments, the output device may give a verbal indication of whether the spelling is correct or not, a verbal indication of whether one or more incorrect locations have been selected and/or feedback indicating correct locations that have not been selected. In some embodiments, the output device may provide haptic feedback indicating whether the at least one braille character corresponds to the correct spelling of the word. The processor may determine to provide feedback as each wrong letter is inserted or may determine to provide feedback after the entire word, phrase, sentence, etc. is written.

Returning to block 902, if it is determined that the auto correct mode has been selected, the method 900 proceeds to block 914. In block 914, the sensor may detect data corresponding to at least one braille character. This data may be transmitted to the processor which may then determine which character is being written.

In block 916, the processor may determine a direction that the selected word is being written based on the sensed data. This determination may be made based on the location of the at least one braille character and/or the orientation of the at least one braille character. Block 916 may function in a similar manner as the block 908.

In block 918, the processor may determine at least one potential word that the user may be trying to spell using the at least one braille character. This determination may be made based on a comparison of the detected at least one braille character to a database to determine a match. In some embodiments, the processor uses an algorithm to select the potential words that is based on a number of times each potential word has been used, whether a potential word fits contextually with previously-written words or sentences, whether a potential word fits grammatically (i.e., if the previous words refer to a plural subject, then the verb may be a plural verb) or any other suitable factors.

In some embodiments, the memory may include a database corresponding to both orientations of the braille characters. The memory may also include a database including forward and reverse spellings of words. Once the processor knows the orientation and direction in which the word is being written, it may compare the detected braille character to at least one of the databases to determine which character is being written and potentially which word is being written. In some embodiments, the memory may include only one database that corresponds to one direction of spelling and one orientation. In these embodiments, the processor may convert the at least one braille character to match the one direction of spelling and one orientation and then compare the converted at least one braille character to the database.

The processor may begin to select potential words after the first braille character has been recognized, after a pre-determined number of characters have been recognized, whether a potential word has a high likelihood of being correct or the like. The processor may determine any number of potential words based the detected at least one braille character and it may rank the potential words based on the likelihood that they are the selected word.

In some embodiments, the processor may correct the spelling of words after they have already been written. For example, if the user spells "cars" as "caes," the processor may compare the letters "caes" to a database to determine partial matches and the likelihood of each partial match being correct. The likelihood may be determined based on a number of matching characters, the location of each character within the word, the context of previous words written by the user, the similarity of dot patterns between the written characters and potential characters or the like.

In block 920, after the processor has determined at least one potential word, the processor may determine to provide feedback to the user based on the at least one potential word. In some embodiments, the feedback is provided based on the likelihood that at least one potential word is the correct word. For example, the processor may determine not to provide feedback until at least one potential word has a likelihood at or above a predetermined percentage. The processor may determine whether to only provide one potential word or multiple potential words based on the number of potential words, the likelihood of each potential word being the correct word, a user preference, another algorithm or the like. The processor may also determine whether to provide verbal feedback, haptic feedback or another type of feedback (such as visual feedback for a teacher or parent).

In some embodiments, a braille device capable of forming words and/or characters in braille (i.e., raising certain locations in at least one braille cell) is coupled to the processor. In these embodiments, the processor may generate one or more potential letters and/or words to be output by the braille device so that the user may touch the braille device and read the potential word or words.

In some embodiments, the processor may determine, based on user input or an algorithm, that the word should be autocorrected without user feedback. For example, if the likelihood that a potential word is the correct word is above a predetermined threshold, then the processor may determine to insert the word. In these embodiments, the processor may determine whether or not to provide feedback indicating that the word has been changed.

In block 922, the processor may receive an indication of whether one of the at least one potential words is the correct word. In some embodiments, the processor may provide only one word as feedback and the user may indicate whether it is the correct word by using the input device, by performing a gesture to be detected by the sensor, by speaking a "yes" or "no," or the like. In some embodiments, the processor may determine to provide more than one word as feedback and provide them one at a time such that the user can select the correct word as it is being output.

In block 924, if the user indicated that a potential word is the correct word, the processor may complete and/or correct the selected word. For example, the memory may store each character and word that the user is writing and then store the additional letters that spell the selected word and/or replace the misspelled word with the correctly spelled word. The processor may also place the correct spelling in an email, text, word processing document or the like.

If the input by the user indicated that no potential word is the correct word, the method 900 may return to block 914. In some embodiments, the processor may continue to output potential words until a potential word is selected by the user.

FIG. 10A illustrates a phrase written using reverse-orientation braille characters. FIG. 10A includes six braille cells 1000, 1002, 1004, 1006, 1008 and 1010 corresponding to the letters "T H E C A R" in that order.

FIG. 10B illustrates an exemplary use of the teaching mode blocks of the method 900 for reverse direction and reverse-oriented braille writing. The device may output the phrase "the car" via a speaker or other output device and request that the user write the phrase in braille. In FIG. 10B, the user may be writing in reverse order with reverse-oriented braille characters. The user may begin in cell 1020 by correctly writing the braille character corresponding to a reverse-oriented "R." In cell 1022, the user may again correctly write the braille character corresponding to a reverse-oriented "A".

In cell 1024, the user may incorrectly write a reverse-oriented "E." At this point, the processor may determine that the user has incorrectly spelled the word "CAR." The processor may then indicate to the user that the user has incorrectly spelled the word and/or may indicate to the user that the user has written the braille character corresponding to a reverse-oriented "E" instead of "C." In some embodiments, the processor may provide feedback to the user informing the user of the correct way to write the braille character corresponding to a reverse-oriented "C," such as by generating feedback indicating the correct locations that correspond to the letter "C."

FIG. 10C illustrates an exemplary use of the autocorrect mode blocks of the method 900 for reverse direction and reverse-oriented braille writing. In cells 1050 and 1052, the user may correctly write the letters corresponding to "R" and "A." At this point, the processor may determine a list of potential words that include the word "CAR." The processor may determine that "CAR" has the highest likelihood of being the correct word. The device may then provide feedback indicating that "CAR" is a potential word. In response, the processor may fill cell 1054 with the letter "C."

Similarly, in blocks 1056 and 1058, the user may input the braille characters corresponding to the letters "E" and "H." At this point, the processor may determine a list of potential words including the word "THE." The device may then provide feedback indicating that a potential word is "THE." In response, the user may provide an indication that "THE" is the correct word. The device may then input a reverse-oriented "T" into the cell 1060.

FIG. 10D illustrates an exemplary use of the autocorrect mode blocks of the method 900 for forward direction and reverse-oriented braille writing. The user may begin to write the braille characters corresponding to the letters "T" and "H" in cells 1070 and 1072. The processor may then determine that a potential word is "THE" and output feedback to the user indicating that "THE" is a potential word. The user may indicate that "THE" is the correct word and the processor may insert the braille character corresponding to "E" in cell 1074.

The user may then write the braille characters corresponding to the letters "C," "A" and "W" in cells 1076, 1078 and 1080. In response, the processor may look up "C A W" in a database to determine if the letters correspond to a correct spelling of a word. The processor may determine that this string of characters does not correspond to a word in the database. In response, the processor may determine a potential word that the user could have meant instead of the letters "C A W." The processor may determine that "CAR" is a potential word and generate feedback indicating that "CAR" is a potential word. The user may respond to the feedback with an indication that "CAR" is correct. In response, the processor may replace the braille character corresponding to the reverse-oriented "W" in cell 1080 with a braille character corresponding to a reverse-oriented "R."

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for at least one of teaching or autocorrecting braille comprising:
   a stylus having a tip and being configured to be pressed against and to indent a substrate;
   a camera configured to detect image data corresponding to one or more indentations made within the substrate using the stylus;
   a processor coupled to the camera and configured to:
   determine selected locations that include one or more protrusions that extend away from the substrate, the selected locations corresponding to locations on the substrate at which the tip of the stylus was pressed against and indented the substrate based on a specific braille character being written and to braille locations within a braille cell,
   identify at least one braille character based on the selected locations by comparing the selected locations to the braille locations within the braille cell,
   determine at least one alphanumeric character corresponding to the at least one braille character based on the at least one braille character,
   determine a potential word that fits contextually with previous-words based on a comparison of the selected locations that include the one or more protrusions that extend away from the substrate to correct locations of one or more protrusions corresponding to a correct braille character, and
   determine feedback data based on the at least one alphanumeric character corresponding to the at least one braille character and the potential word;
   an output device coupled to the processor and configured to output the feedback data; and
   an input device coupled to the processor and configured to receive user input that indicates that the potential word is a selected word, wherein the processor is further configured to:
   autocomplete the at least one braille character with remaining characters of the potential word in response to the user input indicating that the potential word is the selected word.

2. The system of claim 1 wherein the processor is further configured to:
   compare the selected locations that include the one or more protrusions that extend away from the substrate to correct locations of the one or more protrusions corresponding to the correct braille character; and
   determine that the selected locations do not match the correct locations, wherein
   the feedback data informs a user that the selected locations do not match the correct locations.

3. The system of claim 2 wherein to determine that the selected locations do not match the correct locations the processor is further configured to:
   determine that one of the selected locations was incorrectly selected based on the comparison; and
   determine that the at least one braille character corresponds to a misspelling of a word or an incorrectly-written braille character based on the determination that one of the selected locations was incorrectly selected.

4. The system of claim 3, wherein the processor is further configured to:
   determine a correctly-written braille character of the potential word; and
   replace the incorrectly-written braille character with the correctly-written braille character in response to determining that the at least one braille character corresponds to the misspelling of the word or the incorrectly-written braille character.

5. The system of claim 1 further comprising two elongate members and wherein the camera is capable of detecting a position of the two elongate members and the processor is further configured to determine a size of a braille cell based on the position of the two elongate members.

6. The system of claim 1 wherein the at least one braille character is reverse-oriented.

7. The system of claim 6 wherein the at least one braille character is written in a reverse direction.

8. The system of claim 1 further comprising:
   an upper portion having a first end and a second end and configured to rest on a neck of a user;
   a first lower portion coupled to the first end of the upper portion and configured to rest on a first shoulder of the user; and
   a second lower portion coupled to the second end of the upper portion and configured to rest on a second shoulder of the user,
   wherein the camera is positioned on a front surface of the first lower portion or the second lower portion.

9. The system of claim 1 wherein the processor is further configured to determine whether the at least one braille character is forward-oriented or reverse-oriented based on the image data, a reverse-oriented braille character corresponding to a mirror image of a forward-oriented braille character, and to determine the at least one alphanumeric character further based on the determination of whether the at least one braille character is forward-oriented or reverse-oriented.

10. A system for at least one of teaching or autocorrecting braille comprising:
   a camera configured to detect image data including one or more indentations made within a substrate using a stylus having a tip, the image data corresponding to at least one reverse-oriented braille character which is a mirror image of a standard representation of the at least one reverse-oriented braille character;
   a processor coupled to the camera and configured to:
      determine selected locations that include one or more protrusions that extend away from the substrate, the selected locations corresponding to locations on the substrate at which the tip of the stylus was pressed against and indented the substrate based on a specific reverse-oriented braille character being written and to braille locations within a braille cell,
      identify the at least one reverse-oriented braille character based on the selected locations by comparing the selected locations to the braille locations within the braille cell,
      determine that the at least one reverse-oriented braille character is reverse-oriented based on the image data,
      determine at least one alphanumeric character corresponding to the at least one reverse-oriented braille character based on the image data and the determination that the at least one reverse-oriented braille character is reverse-oriented,
      compare the selected locations that include the one or more protrusions that extend away from the substrate to correct locations of one or more protrusions corresponding to a correct braille character,
      determine that the selected locations are missing an indentation or have an additional indentation in comparison to the correct locations based on the comparison,
      determine a potential word that fits contextually with previous-words in response to the determination that the selected locations are missing the indentation or have the additional indentation, and
      determine feedback data based on the at least one alphanumeric character corresponding to the at least one reverse-oriented braille character and the potential word;
   an output device coupled to the processor and configured to output the feedback data; and
   an input device coupled to the processor and configured to receive user input that indicates that the potential word is a selected word, wherein the processor is further configured to:
   autocomplete the at least one braille character with remaining characters of the potential word in response to the user input indicating that the potential word is the selected word.

11. The system of claim 10 further comprising two elongate members and wherein the image data includes a position of the two elongate members and the processor is further configured to determine a size of a braille cell based on the position of the two elongate members.

12. The system of claim 10 wherein the at least one reverse-oriented braille character is written in a reverse direction.

13. The system of claim 10 further comprising:
   an upper portion having a first end and a second end and configured to rest on a neck of a user;
   a first lower portion coupled to the first end of the upper portion and configured to rest on a first shoulder of the user; and
   a second lower portion coupled to the second end of the upper portion and configured to rest on a second shoulder of the user,
   wherein the camera is positioned on a front surface of the first lower portion or the second lower portion.

14. The system of claim 10 further comprising:
   an input/output port coupled to the processor; and
   a computing device such that the processor and the input/output port are positioned on the computing device,
   wherein the camera is positioned remote from the computing device and coupled to the computing device via the input/output port.

15. A system for at least one of teaching or autocorrecting braille comprising:
   a camera configured to detect image data corresponding to one or more indentations made within a substrate using a stylus having a tip;
   a processor coupled to the camera and configured to:
      determine selected locations that include one or more protrusions that extend away from the substrate, the selected locations corresponding to locations on the substrate at which the tip of the stylus was pressed against and indented the substrate based on a specific braille character being written and to braille locations within a braille cell;
      identify at least one braille character based on the selected locations by comparing the selected locations to the braille locations within the braille cell,
      determine at least one alphanumeric character based on the at least one braille character,
      determine a potential word that fits contextually with previous-words based on a comparison of the selected locations that include the one or more protrusions that extend away from the substrate to correct locations of one or more protrusions corresponding to a correct braille character, and
      determine feedback data based on the at least one alphanumeric character corresponding to the at least one braille character and the potential word;
   an output device coupled to the processor and configured to output the feedback data; and
   an input device coupled to the processor and configured to receive user input that indicates that the potential word is a selected word, wherein the processor is further configured to:
   autocomplete the at least one braille character with remaining characters of the potential word in response to the user input indicating that the potential word is the selected word.

16. The system of claim 15 further comprising two elongate members and wherein the image data includes a position of the two elongate members and the processor is further configured to determine a size of a braille cell based on the position of the two elongate members.

17. The system of claim 15 further comprising:
an upper portion having a first end and a second end and configured to rest on a neck of a user;
a first lower portion coupled to the first end of the upper portion and configured to rest on a first shoulder of the user; and
a second lower portion coupled to the second end of the upper portion and configured to rest on a second shoulder of the user,
wherein the camera is positioned on a front surface of the first lower portion or the second lower portion.

18. The system of claim 15 wherein the processor is further configured to:
determine a direction in which the at least one braille character is being written based on the image data, and
determine whether the at least one braille character is forward-oriented or reverse-oriented based on the image data, a reverse-oriented braille character corresponding to a mirror image of a forward-oriented braille character,
wherein to determine the at least one alphanumeric character is further based on the direction in which the at least one braille character is being written and the determination of whether the at least one braille character is forward-oriented or reverse-oriented.

* * * * *